(12) United States Patent
Van Asten et al.

(10) Patent No.: US 12,473,774 B1
(45) Date of Patent: *Nov. 18, 2025

(54) COMPOUND FENESTRATION ASSEMBLIES WITH MULL END CONNECTORS AND METHODS

(71) Applicant: ANDERSEN CORPORATION, Bayport, MN (US)

(72) Inventors: Arik Van Asten, St. Paul, MN (US); Jeremyah Biederman, Lake Elmo, MN (US); Stephen Rippe, White Bear Lake, MN (US)

(73) Assignee: Andersen Corporation, Bayport, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/634,009

(22) Filed: Apr. 12, 2024

Related U.S. Application Data

(63) Continuation of application No. 17/939,402, filed on Sep. 7, 2022, now Pat. No. 11,988,034.

(60) Provisional application No. 63/242,157, filed on Sep. 9, 2021.

(51) Int. Cl.
*E06B 1/60* (2006.01)
*E06B 1/36* (2006.01)
*E06B 3/964* (2006.01)

(52) U.S. Cl.
CPC ............ *E06B 1/366* (2013.01); *E06B 1/6007* (2013.01); *E06B 3/964* (2013.01)

(58) Field of Classification Search
CPC .... F16B 11/006; F16B 47/003; B29C 65/542; E06B 1/366; E06B 1/6007; E06B 3/964; E06B 3/9624; E06B 3/365
See application file for complete search history.

(56) References Cited

U.S. PATENT DOCUMENTS

| | | |
|---|---|---|
| 3,532,316 A | 10/1970 | Mathes ................. B29C 65/542 248/467 |
| 4,167,088 A | 9/1979 | Governale .............. E06B 1/524 49/501 |
| 4,214,405 A | 7/1980 | Chupik ..................... E06B 1/70 49/504 |
| 4,389,035 A | 6/1983 | Freeman |
| 6,360,498 B1 | 3/2002 | Westphal .............. E06B 1/6007 52/204.5 |
| 7,815,988 B2 | 10/2010 | Stumpf ................... B29C 66/80 428/40.9 |
| 7,833,620 B2 | 11/2010 | Enserink ............... F16B 47/003 428/321.1 |

(Continued)

FOREIGN PATENT DOCUMENTS

| | | |
|---|---|---|
| DE | 2636627 A1 | 2/1978 |
| DE | 19737576 A1 | 3/1999 |
| EP | 0878591 A1 | 11/1998 |

*Primary Examiner* — Kyle J. Walraed-Sullivan
(74) *Attorney, Agent, or Firm* — Mueting Raasch Group

(57) ABSTRACT

Compound fenestration assembly mull joints including one or more mull end connectors, compound fenestration assemblies using those mull joints, and methods of making and using the same are described herein. The compound fenestration assembly mull joints including one or more mull end connectors described herein are configured to be attached to the building opening using a flowable bonding agent (in addition to attachment of the fenestration units to the building openings).

39 Claims, 11 Drawing Sheets

(56) References Cited

U.S. PATENT DOCUMENTS

| | | | |
|---|---|---|---|
| 8,464,480 B2 | 6/2013 | Libby | E06B 1/34 52/204.58 |
| 9,175,707 B2 | 11/2015 | Drüke | F16B 19/00 |
| 9,410,360 B2 | 8/2016 | Wei | E06B 3/964 |
| 9,932,765 B1* | 4/2018 | Kelley | E06B 3/964 |
| 9,982,697 B2 | 5/2018 | Clemens | B29C 66/474 |
| 10,233,688 B1* | 3/2019 | Kelley | E06B 3/964 |
| 10,378,569 B2 | 8/2019 | Jensen | F16B 47/003 |
| 10,400,806 B2 | 9/2019 | Druke | |
| 10,458,454 B2 | 10/2019 | Woleader | B29C 66/5344 |
| 10,626,664 B1* | 4/2020 | Kelley | E06B 1/6015 |
| 10,760,329 B1* | 9/2020 | Maas | E06B 3/9642 |
| 10,968,687 B1 | 4/2021 | Kelley et al. | |
| 2002/0092248 A1 | 7/2002 | Westphal | E06B 1/6007 52/204.5 |
| 2003/0217523 A1 | 11/2003 | Budzinski | E06B 1/6007 52/204.5 |
| 2004/0105735 A1 | 6/2004 | Favre-Bulle | F16B 37/06 411/147 |
| 2007/0079557 A1 | 4/2007 | Pepper | E06B 3/365 49/367 |
| 2008/0010919 A1 | 1/2008 | Tufts | E06B 1/366 52/204.591 |
| 2008/0216424 A1* | 9/2008 | Westphal | E06B 1/6007 52/204.5 |
| 2008/0229668 A1 | 9/2008 | Meeks | E05C 1/02 49/367 |
| 2009/0000225 A1 | 1/2009 | Ito | E06B 1/366 52/204.5 |
| 2013/0212973 A1* | 8/2013 | Saunders | E06B 1/366 52/656.5 |
| 2015/0020465 A1 | 1/2015 | Saunders | E06B 3/663 52/204.6 |
| 2015/0114544 A1 | 4/2015 | Amstutz | F16M 13/02 248/205.3 |
| 2015/0233169 A1* | 8/2015 | Saunders | E06B 1/6007 52/204.7 |
| 2018/0163758 A1 | 6/2018 | Fauchery | F16B 5/0088 |
| 2019/0093416 A1 | 3/2019 | Luvison | E06B 1/524 |

\* cited by examiner

COMPOUND FENESTRATION ASSEMBLIES WITH MULL END CONNECTORS AND METHODS

RELATED APPLICATION

This application is a continuation application of U.S. patent application Ser. No. 17/939,402, filed Sep. 7, 2022, which claims the benefit under 35 U.S.C. Section 119 of U.S. Provisional Patent Application Ser. No. 63/242,157 entitled "COMPOUND FENESTRATION ASSEMBLIES WITH MULL END CONNECTORS AND METHODS" and filed on Sep. 9, 2021, which is incorporated herein by reference in its entirety.

Compound fenestration assembly mull joints including one or more mull end connectors, compound fenestration assemblies using those mull joints, and methods of making and using the same are described herein.

BACKGROUND

Compound fenestration assemblies, sometimes referred to as mulled fenestration assemblies, are formed by attaching two or more individual fenestration units (e.g., windows and/or doors) along one or more mull joints to form a combination of windows, doors, or windows and doors, that can be handled and installed as a single assembly, and which give the appearance of being a single assembly.

In addition to being joined to each other, the fenestration units must also be secured in a building opening constructed to receive the compound fenestration assemblies (sometimes referred to as a "rough opening"). While securing the individual fenestration units within the building opening is typically done, in many instances, mull joint components used to attach the fenestration units to each other at the mull joint (e.g., spacer boards, interlocking brackets or other similar devices that can be separately installed on the facing surfaces of the frames to be joined and then coupled together to form the compound unit, etc.) are not typically attached to the building opening.

SUMMARY

Compound fenestration assembly mull joints including one or more mull end connectors, compound fenestration assemblies using those mull joints, and methods of making and using the same are described herein.

The compound fenestration assembly mull joints including one or more mull end connectors described herein are configured to be attached to the building opening using a flowable bonding agent (in addition to attachment of the fenestration units to the building openings). As a result, the ability of the compound fenestration assembly to maintain integrity when subjected to, e.g., wind loads and other forces is improved as compared to a compound fenestration assembly in which only the fenestration units themselves are attached to the building opening. The benefits of attaching mull joints to the building opening may be enhanced with an increase in the number of adjacent fenestration units (and, therefore, mull joints) in a given compound fenestration assembly.

While some mull joint components may be designed for attachment to a building opening (in addition to attachment of the fenestration units connected by the mull joint components), the ability to move the mull end connectors at the ends of the mull joints both along a length of a side of the building opening as well as into and out of the building opening before attaching them to the building opening can both simplify and expedite the installation process. After the mull end connectors and the mull joints to which they are connected are in the desired position, a flowable bonding agent can be introduced into a bonding agent cavity of the mull end connectors to secure the mull end connectors and, therefore, the ends of the mull joints in that desired position.

In one or more embodiments, the mull end connectors of the mull joints described herein can be provided at both ends of all mull joints found at the outer perimeter of a compound fenestration assembly. As a result, the attachment of the mull joints at every location where the ends of mull joints of a given compound fenestration assembly abut the building opening can be provided, with every such junction between a mull joint end and the building opening exhibiting the same strength (if so desired). The result can further improve the transfer of mechanical loads (e.g., wind loads, etc.) from the compound fenestration assembly to the building opening. For example, in one or more embodiments the mull end connectors may be provided at the ends of horizontal mull joints as well as vertical mull joints, with all of the mull end connectors being adjustable before attachment using a flowable bonding agent as described herein.

In one or more embodiments, the mull joints used to construct compound fenestration assemblies as described herein do not require disassembly of the fenestration units forming the compound fenestration assembly to connect adjacent fenestration units in a compound fenestration assembly.

In one or more embodiments, the mull joints used to construct compound fenestration assemblies as described herein do not impact visible areas of the individual fenestration units forming the compound fenestration assemblies, e.g., the mull joints do not require fasteners to be located in positions where they could be exposed on one or more of the fenestration units of a compound fenestration assembly as described herein.

In a first aspect, one or more embodiments of a compound fenestration assembly as described herein include: a first frame member of a first fenestration unit attached to a second frame member of a second fenestration unit along a mull joint having a first end and a second end, wherein the mull joint defines a mull joint axis extending along a length of the mull joint between the first and second ends of the mull joint, wherein the first and second frame members comprise exterior sides facing in the same direction and interior sides facing in an opposite direction from the exterior sides, wherein an interior/exterior axis extends between the interior and exterior sides in a direction transverse to the mull joint axis, wherein the first frame member faces the second frame member across the mull joint, and wherein a separation axis extends through the mull joint between the first and second frame members, the separation axis extending in a direction transverse to both the mull joint axis and the interior/exterior axis. The compound fenestration assembly also includes a first joining strip attached to the first frame member of the first fenestration unit, the first joining strip comprising a first end proximate the first end of the mull joint, wherein the first joining strip comprises a channel aligned with the mull joint axis, the channel opening towards the exterior side of the first fenestration unit; and a second joining strip attached to the second frame member of the second fenestration unit, the second joining strip comprising a first end proximate the first end of the mull joint, wherein the second joining strip comprises a channel aligned with the mull joint axis, the channel opening towards the interior side of the second fenestration unit such that the channel on the first joining strip mechanically interlocks with the channel on the second joining strip, wherein the mechanically interlocking channels prevent movement of the first frame member away from the second frame member along the separation axis, prevent movement of the first frame member towards the exterior side of the second frame member along the interior/exterior axis, and prevent movement of the second frame member towards the interior side of the first frame member along the interior/exterior axis. Also included is a mull end connector comprising a base and a connector leg, the base comprising an inner face facing the first end of the mull joint and an outer face facing away from the first end of the mull joint, a connector leg attached to the inner face of the base, the connector leg extending away from the inner face along the mull joint axis, the connector leg extending into a mull end connector cavity at the first end of the mull joint, a bonding agent cavity on the outer face of the base, the bonding agent cavity comprising a border defining at least a portion of a cavity perimeter located within a base perimeter on the outer face of the base, and a chamber configured to deliver bonding agent to the bonding agent cavity, the chamber comprising an input port opening located along the interior/exterior axis and a delivery port opening into the bonding agent cavity, wherein the input port is in fluid communication with the bonding agent cavity through the chamber and the delivery port.

In one or more embodiments of a compound fenestration assembly according to the first aspect, the connector leg is retained within the mull end connector cavity by an interference fit.

In one or more embodiments of a compound fenestration assembly according to the first aspect, the border of the bonding agent cavity defines a gap such that the border extends only partially around the cavity perimeter.

In one or more embodiments of a compound fenestration assembly according to the first aspect, the mull end connector comprises a fill vent opening into the bonding agent cavity, the fill vent configured to provide an exit path out of the bonding agent cavity for a flowable bonding agent delivered into the bonding agent cavity through the input port. In one or more embodiments, the fill vent comprises a gap in the border such that the border extends only partially around the cavity perimeter.

In one or more embodiments of a compound fenestration assembly according to the first aspect, the base perimeter on the outer face of the base comprises a base perimeter wall, and wherein the border comprises a border wall, wherein at least a portion of the border wall is spaced inward from the base perimeter wall towards a geometric center of the outer face of the base as defined by the base perimeter.

In one or more embodiments of a compound fenestration assembly according to the first aspect, the chamber defines a chamber axis extending through the input port and aligned with the interior/exterior axis, wherein the delivery port is located distal from the input port as measured along the chamber axis.

In one or more embodiments of a compound fenestration assembly according to the first aspect, the connector leg comprises a connector leg depth measured along the interior/exterior axis, and wherein the base comprises a base depth measured along the interior/exterior axis, wherein the connector leg depth is less than the base depth. In one or more embodiments, the connector leg is not centered on the base in a direction aligned with the interior/exterior axis.

In one or more embodiments of a compound fenestration assembly according to the first aspect, the base comprises a front edge proximate the input port and a back edge distal from the front edge as measured along the interior/exterior axis, wherein the connector leg comprises a connector leg depth measured between a forward edge and a rear edge along the interior/exterior axis, wherein a first distance between the rear edge and the back edge measured along the interior/exterior axis is less than a second distance between the forward edge and the front edge measured along the interior/exterior axis.

In one or more embodiments of a compound fenestration assembly according to the first aspect, the bonding agent cavity comprises depth measured along the mull joint axis, and wherein the depth of the bonding agent cavity proximate the border is less than a depth of the bonding agent cavity proximate the chamber.

In one or more embodiments of a compound fenestration assembly according to the first aspect, the assembly comprises a base plate configured to be placed between a building opening and the outer face of the mull end connector, wherein the base plate is configured for attachment to the building opening, and wherein the base plate comprises a base plate surface larger than the outer face of the base. In one or more embodiments, the base plate comprises a plurality of openings configured to receive mechanical fasteners to attach the base plate to the building opening, and wherein the plurality of openings define a receiving surface on the base plate surface within a fastener perimeter defined by the plurality of openings, and wherein the receiving surface is larger than the outer face of the base. In one or more embodiments, the base plate comprises a metal plate.

In one or more embodiments of a compound fenestration assembly according to the first aspect, the base and the connector leg of the mull end connector are separate and discrete components, wherein the bonding agent cavity and the chamber are located in the base, and wherein the connector leg attaches to the base at a mull end connector joint. In one or more embodiments, the mull end connector joint defines a bonding agent reservoir between the base and the connector leg, wherein the bonding agent reservoir is in fluid communication with the chamber through a reservoir port such that the input port is in fluid communication with the bonding agent reservoir through the chamber and the reservoir port.

In one or more embodiments of a compound fenestration assembly according to the first aspect, the flowable bonding agent comprises one or more flowable bonding agents selected from the group of: methyl methacrylate adhesive, urethane adhesive, cyanoacrylate adhesive, epoxy-based adhesive, hotmelt adhesive, and structural silicone adhesive.

In a second aspect, one or more embodiments of a method of installing a compound fenestration assembly in a building opening in a building includes: inserting a connector leg of a mull end connector into a mull end connector cavity in a first end of a mull joint connecting a first fenestration unit to a second fenestration unit, wherein the mull joint defines a mull joint axis extending along a length of the mull joint between the first end and a second end of the mull joint, and wherein the connector leg extends into the mull end connector cavity along the mull joint axis; placing the first fenestration unit and the second fenestration unit in a building opening after inserting the connector leg of the mull end connector into the mull end connector cavity in the mull joint formed between a first fenestration unit and a second fenestration unit, wherein an outer face of a base of the mull end connector faces an opening surface defining the building opening proximate the first end of the mull joint; and delivering a flowable bonding agent into a bonding agent cavity on the outer face of the base after placing the first fenestration unit and the second fenestration unit in the building opening such that the outer face of a base of the mull end connector faces the opening surface defining the building opening, wherein the bonding agent bonds the base of the mull end connector to the opening surface defining the building opening.

In one or more embodiments of a method according to the second aspect, the method comprises adjusting a position of the mull joint and the first fenestration unit and the second fenestration unit relative to the opening surface defining the building opening after placing the first fenestration unit and the second fenestration unit in the building opening and before delivering the flowable bonding agent into the bonding agent cavity.

In one or more embodiments of a method according to the second aspect, the connector leg is retained within the mull end connector cavity by an interference fit after inserting the connector leg into the mull end connector cavity.

In one or more embodiments of a method according to the second aspect, the mull end connector comprises a chamber comprising an input port and a delivery port, wherein the delivery port opens into the bonding agent cavity, wherein delivering the flowable bonding agent into the bonding agent cavity comprises injecting the bonding agent into the chamber through the input port such that the flowable bonding agent flows through the delivery port into the bonding agent cavity.

In one or more embodiments of a method according to the second aspect, delivering the flowable bonding agent into the bonding agent cavity comprises delivering the flowable bonding agent into the bonding agent cavity until the flowable bonding agent exits the bonding agent cavity through a fill vent.

In one or more embodiments of a method according to the second aspect, the method comprises attaching a base plate to the opening surface defining the building opening before placing the first fenestration unit and the second fenestration unit in the building opening, wherein the outer face of the base of the mull end connector faces the base plate. In one or more embodiments, attaching the base plate to the opening surface defining the building opening comprises inserting mechanical fasteners into the opening surface through fastener openings in the base plate, wherein the mechanical fasteners and the fastener openings define a receiving area on the base plate within a receiving area perimeter defined by the mechanical fasteners and the fastener openings, and wherein the receiving area is larger than the outer face of the base of the mull end connector. In one or more embodiments, the method comprises adjusting a position of the mull joint and the first fenestration unit and the second fenestration unit relative to the base plate after placing the first fenestration unit and the second fenestration unit in the building opening and before delivering the flowable bonding agent into the bonding agent cavity.

In one or more embodiments of a method according to the second aspect, the first and second fenestration units comprise exterior sides facing in the same direction and interior sides facing in an opposite direction from the exterior sides, wherein an interior/exterior axis extends between the interior and exterior sides in a direction transverse to the mull joint axis, and wherein the connector leg comprises a connector leg depth measured along the interior/exterior axis, and wherein the base comprises a base depth measured along the interior/exterior axis, wherein the connector leg depth is less than the base depth. In one or more embodiments, the connector leg is not centered on the base in a direction aligned with the interior/exterior axis.

In one or more embodiments of a method according to the second aspect, in a direction aligned with the mull joint axis, the bonding agent cavity comprises depth proximate a cavity perimeter of the bonding agent cavity that is less than a depth of the bonding agent cavity directly between the connector leg and the opening surface of the building opening.

In one or more embodiments of a method according to the second aspect, the flowable bonding agent comprises one or more flowable bonding agents selected from the group of: methyl methacrylate adhesive, urethane adhesive, cyanoacrylate adhesive, epoxy-based adhesive, hotmelt adhesive, and structural silicone adhesive.

In a third aspect, one or more embodiments of a compound fenestration assembly as described herein includes: a first fenestration unit attached to a second fenestration unit along a mull joint having a first end and a second end, wherein the mull joint defines a mull joint axis extending along a length of the mull joint between the first and second ends of the mull joint, and wherein the first and second fenestration units comprise exterior sides facing in the same direction and interior sides facing in an opposite direction from the exterior sides, wherein an interior/exterior axis extends between the interior and exterior sides in a direction transverse to the mull joint axis; a mull end connector cavity located between the first fenestration unit and the second fenestration unit at the first end of the mull joint; and a mull end connector comprising a base comprising an inner face facing the first end of the mull joint and an outer face facing away from the first end of the mull joint, a connector leg attached to the inner face of the base, the connector leg extending away from the inner face along the mull joint axis, the connector leg extending into the mull end connector cavity between the first fenestration unit and the second fenestration unit at the first end of the mull joint, a bonding agent cavity on the outer face of the base, the bonding agent cavity comprising a border defining at least a portion of a cavity perimeter located within a base perimeter on the outer face of the base, and a chamber configured to deliver bonding agent to the bonding agent cavity, the chamber comprising an input port opening located along the interior/exterior axis and a delivery port opening into the bonding agent cavity, wherein the input port is in fluid communication with the bonding agent cavity through the chamber and the delivery port.

In one or more embodiments of a compound fenestration assembly according to the third aspect, the connector leg is retained within the mull end connector cavity by an interference fit.

In one or more embodiments of a compound fenestration assembly according to the third aspect, the border of the bonding agent cavity defines a gap such that the border extends only partially around the cavity perimeter.

In one or more embodiments of a compound fenestration assembly according to the third aspect, the mull end connector comprises a fill vent opening into the bonding agent cavity, the fill vent configured to provide an exit path out of the bonding agent cavity for a flowable bonding agent delivered into the bonding agent cavity through the input port in one or more embodiments, the fill vent comprises a gap in the border such that the border extends only partially around the cavity perimeter.

In one or more embodiments of a compound fenestration assembly according to the third aspect, the base perimeter on the outer face of the base comprises a base perimeter wall, and wherein the border comprises a border wall, wherein at least a portion of the border wall is spaced inward from the base perimeter wall towards a geometric center of the outer face of the base as defined by the base perimeter.

In one or more embodiments of a compound fenestration assembly according to the third aspect, the chamber defines a chamber axis extending through the input port and aligned with the interior/exterior axis, wherein the delivery port is located distal from the input port as measured along the chamber axis.

In one or more embodiments of a compound fenestration assembly according to the third aspect, the connector leg comprises a connector leg depth measured along the interior/exterior axis, and wherein the base comprises a base depth measured along the interior/exterior axis, wherein the connector leg depth is less than the base depth. In one or more embodiments, the connector leg is not centered on the base in a direction aligned with the interior/exterior axis.

In one or more embodiments of a compound fenestration assembly according to the third aspect, the base comprises a front edge proximate the input port and a back edge distal from the front edge as measured along the interior/exterior axis, wherein the connector leg comprises a connector leg depth measured between a forward edge and a rear edge along the interior/exterior axis, wherein a first distance between the rear edge and the back edge measured along the interior/exterior axis is less than a second distance between the forward edge and the front edge measured along the interior/exterior axis.

In one or more embodiments of a compound fenestration assembly according to the third aspect, the bonding agent cavity comprises depth measured along the mull joint axis, and wherein the depth of the bonding agent cavity proximate the border is less than a depth of the bonding agent cavity proximate the chamber.

In one or more embodiments of a compound fenestration assembly according to the third aspect, the assembly comprises a base plate configured to be placed between a building opening and the outer face of the mull end connector, wherein the base plate is configured for attachment to the building opening, and wherein the base plate comprises a base plate surface larger than the outer face of the base. In one or more embodiments, the base plate comprises a plurality of openings configured to receive mechanical fasteners to attach the base plate to the building opening, and wherein the plurality of openings define a receiving surface on the base plate surface within a fastener perimeter defined by the plurality of openings, and wherein the receiving surface is larger than the outer face of the base. In one or more embodiments, the base plate comprises a metal plate.

In one or more embodiments of a compound fenestration assembly according to the third aspect, the base and the connector leg of the mull end connector are separate and discrete components, wherein the bonding agent cavity and the chamber are located in the base, and wherein the connector leg attaches to the base at a mull end connector joint. In one or more embodiments, the mull end connector joint defines a bonding agent reservoir between the base and the connector leg, wherein the bonding agent reservoir is in fluid communication with the chamber through a reservoir port such that the input port is in fluid communication with the bonding agent reservoir through the chamber and the reservoir port.

In one or more embodiments of a compound fenestration assembly according to the third aspect, the flowable bonding agent comprises one or more flowable bonding agents selected from the group of: methyl methacrylate adhesive, urethane adhesive, cyanoacrylate adhesive, epoxy-based adhesive, hotmelt adhesive, and structural silicone adhesive.

In a fourth aspect, one or more embodiments of a compound fenestration assembly as described herein include: a mull joint connecting a first fenestration unit to a second fenestration unit, the mull joint defining a mull joint axis extending along a length of the mull joint between the first end and a second end of the mull joint; a mull end connector located at the first end of the mull joint, the mull end connector comprising: a connector leg extending into a mull end connector cavity extending into the mull joint at the first end of the mull joint, and a base attached to the connector leg, wherein the base comprises an outer face extending away from the first end of the mull joint; and a flowable bonding agent located between the outer face of the base of the mull end connector and an opening surface defining a building opening in which the first fenestration unit, mull joint, and second fenestration unit are located, wherein the flowable bonding agent is configured to bond the base of the mull end connector to the opening surface.

In one or more embodiments of a compound fenestration assembly according to the fourth aspect, the connector leg is retained within the mull end connector cavity by an interference fit.

In one or more embodiments of a compound fenestration assembly according to the fourth aspect, the base of the mull end connector defines a bonding agent cavity located between the base and the opening surface of the building opening. In one or more embodiments, the base of the mull end connector comprises a border defining at least a portion of a cavity perimeter located within a base perimeter on the outer face of the base, wherein the border defines a gap such that the border extends only partially around the cavity perimeter. In one or more embodiments, the mull end connector comprises a chamber configured to deliver the flowable bonding agent to the bonding agent cavity, the chamber comprising an input port opening and a delivery port opening into the bonding agent cavity, wherein the input port is in fluid communication with the bonding agent cavity through the chamber and the delivery port. In one or more embodiments, the bonding agent cavity comprises depth measured along the mull joint axis, and wherein the depth of the bonding agent cavity proximate the border is less than a depth of the bonding agent cavity proximate the chamber. In one or more embodiments, the mull end connector comprises a fill vent opening into the bonding agent cavity, the fill vent configured to provide an exit path out of the bonding agent cavity for the flowable bonding agent delivered into the bonding agent cavity. In one or more embodiments, the base of the mull end connector comprises a border defining at least a portion of a cavity perimeter located within a base perimeter on the outer face of the base, and wherein the border the fill vent comprises a gap in the border such that the border extends only partially around the cavity perimeter.

In one or more embodiments of a compound fenestration assembly according to the fourth aspect, the connector leg comprises a connector leg depth measured along an interior/exterior axis oriented transverse to the mull joint axis, and wherein the base comprises a base depth measured along the interior/exterior axis, wherein the connector leg depth is less than the base depth. In one or more embodiments, the connector leg is not centered on the base in a direction aligned with the interior/exterior axis.

In one or more embodiments of a compound fenestration assembly according to the fourth aspect, the assembly comprises a base plate configured to be placed between a building opening and the outer face of the base of the mull end connector, wherein the base plate is configured for attachment to the building opening, and wherein the base plate comprises a base plate surface larger than the outer face of the base. In one or more embodiments, the base plate comprises a plurality of openings configured to receive mechanical fasteners to attach the base plate to the building opening, and wherein the plurality of openings define a receiving surface on the base plate surface within a fastener perimeter defined by the plurality of openings, and wherein the receiving surface is larger than the outer face of the base. In one or more embodiments, the base plate comprises a metal plate.

In one or more embodiments of a compound fenestration assembly according to the fourth aspect, the base and the connector leg of the mull end connector are separate and discrete components, wherein the connector leg attaches to the base at a mull end connector joint.

In one or more embodiments of a compound fenestration assembly according to the fourth aspect, the flowable bonding agent comprises one or more flowable bonding agents selected from the group of: methyl methacrylate adhesive, urethane adhesive, cyanoacrylate adhesive, epoxy-based adhesive, hotmelt adhesive, and structural silicone adhesive.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

The above summary is not intended to describe each embodiment or every implementation of the compound fenestration assembly mull joints including one or more mull end connectors, compound fenestration assemblies using those mull joints, and methods of making and using the same as described herein. Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

Figure 1:
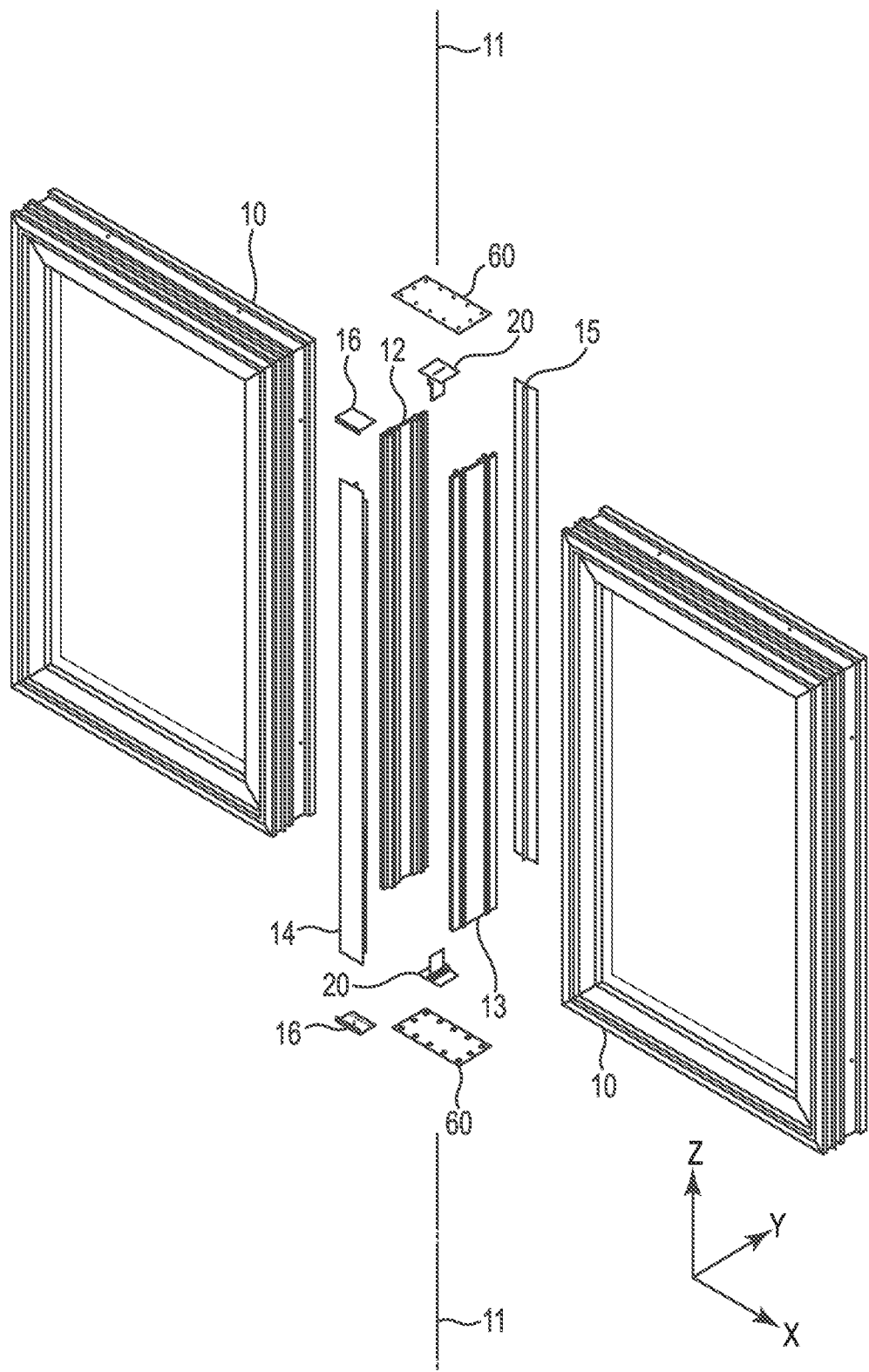
FIG. 1 is an exploded view of one illustrative embodiment of a compound fenestration assembly including a mull joint having mull end connectors as described herein.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

One illustrative embodiment of a compound fenestration assembly including illustrative embodiments of the mull end connectors as described herein is depicted in an exploded assembly diagram in FIG. 1. The compound fenestration assembly depicted in FIG. 1 includes a pair of fenestration units 10. The fenestration units 10 are joined using joining strips 12 and 13 that, in the depicted embodiment, would be attached to each of the fenestration units 10. More specifically, in the depicted embodiment, joining strips 12 could be attached to the left side fenestration unit 10 while joining strips 13 is attached to the right side fenestration unit 10. Mull end connectors 20 are positioned at opposite ends of the mull joint formed by joining strips 12 and 13. Also depicted in FIG. 1 are trim strips 14 and 15 as well as mull end trim pieces 16. The trim strips 14 and 15, along with mull end trim pieces 16 can help to provide a more finished appearance as well as protect the mull joint from infiltration by rain, snow, insects, etc. Also depicted in the exploded assembly diagram of FIG. 1 are optional base plates 60 that can be used in connection with the mull end connectors 20 as described herein.

Figure 2:
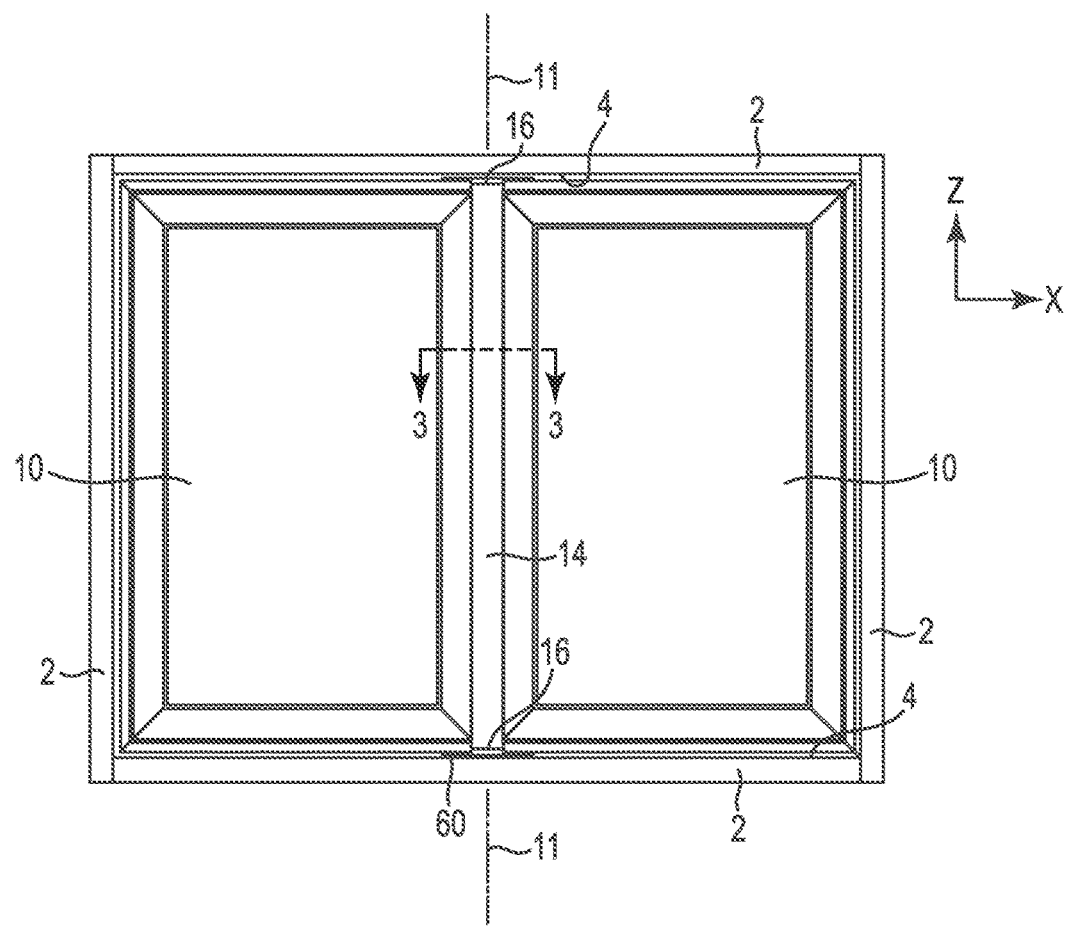
FIG. 2 is a front elevational view of the compound fenestration assembly of FIG. 1 as assembled.

The compound fenestration assembly of FIG. 1 is depicted after assembly and positioning in a building opening. The building opening is defined by framing members 2, with the framing members 2 having opening surfaces 4 that face the fenestration units 10 and the mull joint located therebetween. Also seen in FIG. 2 are optional base plates 60 located at the opposite ends of the mull joint, with the mull joint defining and extending along a mull joint axis 11 between fenestration units 10 (with mull joint axis 11 also depicted in FIG. 1). In the depicted embodiments, the mull joint axis 11 corresponds to the Z-axis of the Cartesian coordinate system depicted in the figures. In the view of FIG. 2, the trim strip 14 blocks the joining strips 12 and 13 from view, while the trim pieces 16 block the mull end connectors of the mull joint from view.

Figure 3:
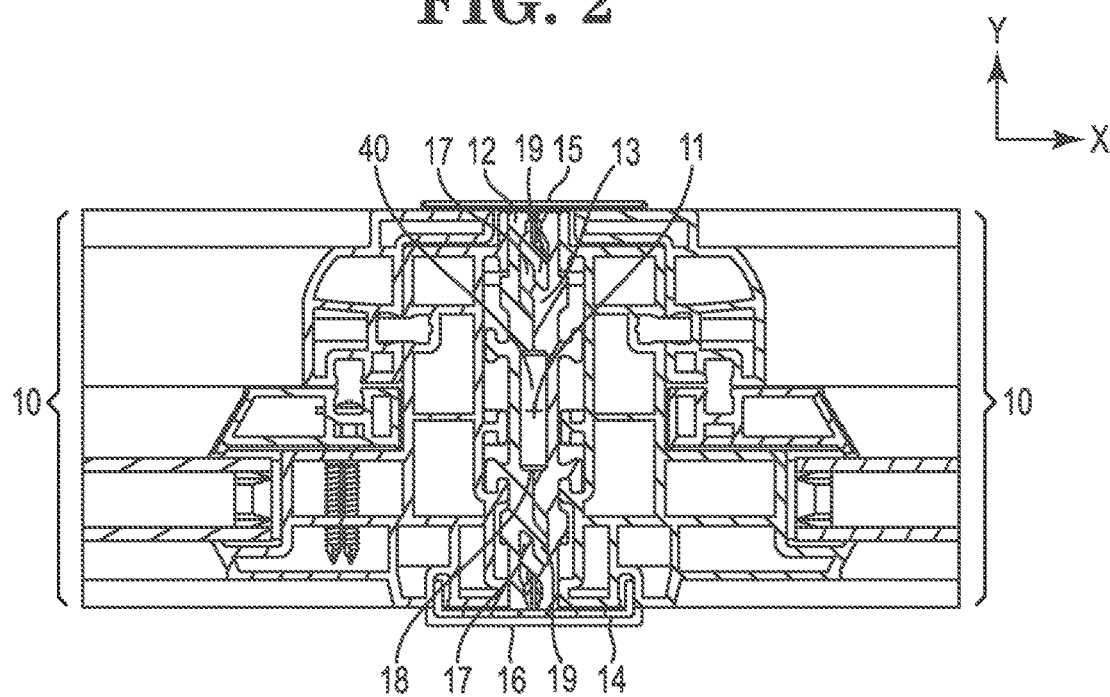
FIG. 3 is a cross-sectional view of the compound fenestration assembly of FIG. 2 taken along line 3-3 in FIG. 2.
Figure 4:
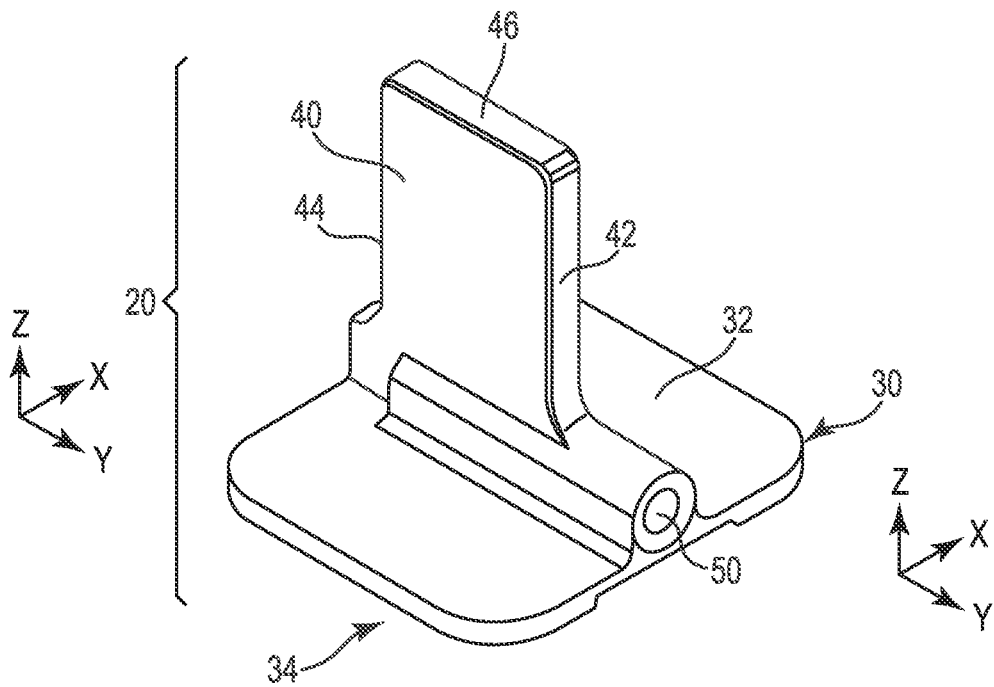
FIG. 4 is a top perspective view of one illustrative embodiment of a mull end connector that can be used in mull joints of compound fenestration assemblies as described herein.

The mull joint formed between the fenestration units 10 is depicted in a cross-sectional view in FIG. 3 in which joining strip 12 is attached to one frame member of the left side fenestration unit 10 while joining strip 13 is attached to the frame member of the right side fenestration unit 10. Trim strips 14 and 15 are located on opposite sides of the frame members of the left and right side fenestration units 10. One of the trim strips 14 may be described as being located along the exterior side of the mull joint and fenestration units 10 while the opposite trim strip 15 may be described as being located along the interior side of the mull joint and fenestration units 10. In alternative embodiments, the interior and exterior sides of the mull joint and fenestration units 10 may be switched.

In the depicted embodiment, joining strip 12 attached to the frame member of the left side fenestration unit 10 includes a pair of channels 17, while joining strip 13 attached to the frame member of the right side fenestration unit 10 includes a pair of complementary channels 19. Channels 17 of joining strip 12 may be described as opening towards the exterior side of the fenestration units 10 while channels 19 joining strip 13 may be described as opening towards the interior side of the fenestration units 10. As such, the joining strips 12 and 13 are oriented such that the channels 17 and 19 mechanically interlock with each other.

As a result, a secure connection between the joining strips 12 and 13 is obtained through the mechanical interlocking of the channel structures in the opposing joining strips 12 and 13, with the mechanically interlocking joining strips resisting movement of the fenestration units relative to each other. For example, the mull joints and compound fenestration assemblies in which mull joints are found may be described as defining an interior/exterior axis that extends between the interior and exterior sides of the mull joint. In the depicted illustrative embodiment as seen in FIG. 3, the interior/exterior axis corresponds to the Y-axis of the Cartesian coordinate system depicted in the figures.

Also with reference to FIG. 3, the frame member of the left side fenestration unit 10 may be described as facing the frame member of the right side fenestration unit 10 across the mull joint, with a separation axis extending through the mull joint between the left and right side fenestration units 10. In the depicted illustrative embodiment as seen in FIG. 3, the separation axis corresponds to the X-axis of the Cartesian coordinate system depicted in the figures.

The interior/exterior axis, separation axis, and mull joint axis are all, in one or more embodiments, perpendicular to each other. These relationships can be seen in many of the figures used to describe the illustrative embodiments of the compound fenestration assemblies and mull joints herein. As noted above, the interior/exterior axis corresponds to the Y-axis, the separation axis corresponds to the X-axis, and the mull joint axis corresponds to the Z axis of the Cartesian coordinate system used in the figures.

In one or more embodiments, the mechanically interlocking channels 17/19 of the joining strips 12 and 13 may be described as preventing movement of the left and right side fenestration members 10 away from each other along the separation axis (i.e., the X-axis while also preventing movement of the left side fenestration unit 10 along the interior/exterior axis towards the exterior sides of the fenestration units 10 (on which trim strip 14 is located) and preventing movement of the right side fenestration unit 10 along the interior/exterior axis towards the interior sides of the fenestration units 10 (on which trim strip 15 is located).

Although the depicted embodiment of joining strips 12 and 13 include pairs of mechanically interlocking channels 17 and 19, the function of the joining strips in preventing movement of the fenestration units relative to each other along both the interior/exterior axis and the separation axis may be accomplished using only one pair of mechanically interlocking channels, with, for example, joining strip 12 including only one of interlocking channels 17 and joining strip 13 including only one of interlocking channels 19, with the single pair of mechanically interlocking channels 17 and 19 on joining strips 12 and 13 performing those functions.

Joining strips such as those depicted in connection with the compound fenestration assembly depicted in FIGS. 1-3 along with other mull joint features that may be used in the compound fenestration assemblies described herein may be described more completely in, for example, U.S. Pat. Nos. 10,626,664 & 10,968,687 (both to Kelley et al.).

The mull joint formed between the fenestration units 10 in the compound fenestration assemblies depicted in FIGS. 1-3 includes a mull end connector cavity 18 that, in the depicted illustrative embodiment, is located between joining strips 12 and 13 and extends along the mull joint axis 11. Although the depicted embodiment of the mull end connector cavity 18 is centered in the mull joint between the fenestration units 10 and the mull joint axis 11 extends through the mull end connector cavity 18, such a construction is not required. For example, the mull end connector cavity could, in one or more alternative embodiments, be located off-center within the mull joint.

The mull end connector cavity 18 of the mull joints described herein is configured to receive a connector leg 40 of the mull end connector 20 located at the end, and preferably both ends, of the mull joint formed between fenestration units 10. In the depicted illustrative embodiment, the mull end connector cavity 18 extends along the entire length of the joining strips 12 and 13. Such a construction is not, however, required and the mull end connector cavities may only be needed at the ends of the mull joint with sufficient depth to receive the connector legs of mull end connectors as described herein.

One illustrative embodiment of a mull end connector 20 that may be used in the mull joints of compound fenestration assemblies as described herein is depicted in FIGS. 4-11. The depicted mull end connector 20 includes a base 30 and a connector leg 40, with the connector leg 40 attached to an inner face 32 of the base 30. The inner face 32 of the base 30 faces the end of the mull joint into which the connector leg 40 is inserted when in use. The base 30 also includes an outer face 34 that faces away from the end of the mull joint into which the connector leg of the mull end connector 20 is inserted when in use.

The connector leg 40 extends away from the inner face 32 of the base 30 along the mull joint axis 11 when in use, with the mull joint axis 11 extending along the Z-axis as described herein. Also as described herein, the connector leg 40 extends into a mull joint cavity 18 (see FIG. 3) when in use. The depicted illustrative embodiment of the connector leg 40 includes a terminal end 46 located distal from the inner face 32 of the base 30 as well as a forward edge 42 and a rear edge 44, with the forward edge 42 and the rear edge 44 extending from the inner surface 32 of the base 30 to the terminal end 46 of the connector leg 40.

In one or more embodiments, the connector leg 40 may be retained within a mull end connector cavity such as, e.g., mull end connector cavity 18, by an interference fit between the connector leg 40 and the mull end connector cavity 18. Other options for retaining the connector leg within a mull end connector cavity may include, but are not limited to, adhesives, mechanically interlocking surfaces (e.g., ratcheting surfaces, etc.), etc. Retaining the connector leg within a mull end connector cavity, whether by an interference fit or otherwise, may make use of the mull end connectors described herein easier by allowing for placement and retention of the mull end connectors in the selected ends of the mull joints before placement of a compound fenestration assembly in a building opening.

Regardless of the technique by which the mull end connector is retained in the mull end connector cavity, it may be beneficial to allow for adjustment in the position of the mull end connector in the mull end connector cavity along the mull joint axis. Allowing for such adjustment in the position of the mull end connector in the mull end connector cavity may allow an installer to move the mull end connector closer to the center of the mull joint during placement of a compound fenestration assembly in a building opening so that the mull end connector is less likely to interfere with placement of the compound fenestration assembly. Once the compound fenestration assembly is in position within the building opening, the mull end connector may be moved outward along the mull joint axis away from the center of the mull joint and towards the surface of the building opening such that the connector leg of the mull end connector is partially withdrawn from the mull end connector cavity and the base of the mull end connector is brought into contact with the surface of the building opening before a flowable bonding agent is delivered into the bonding agent cavity of the mull end connector.

Figure 5:
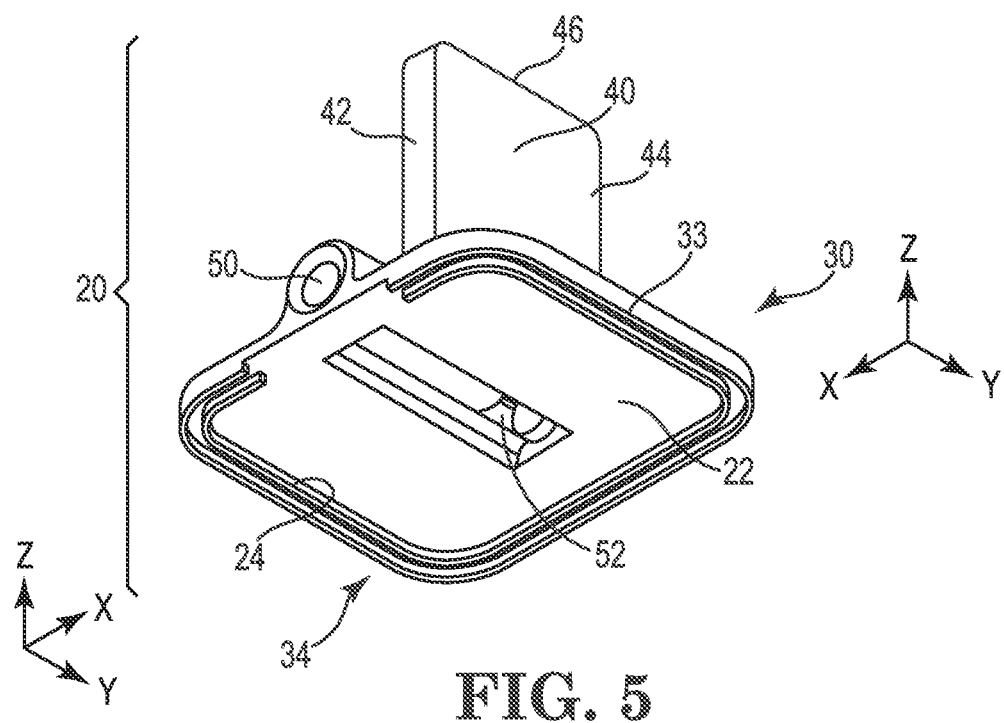
FIG. 5 is a bottom perspective view of the mull end connector of FIG. 4.
Figure 6:
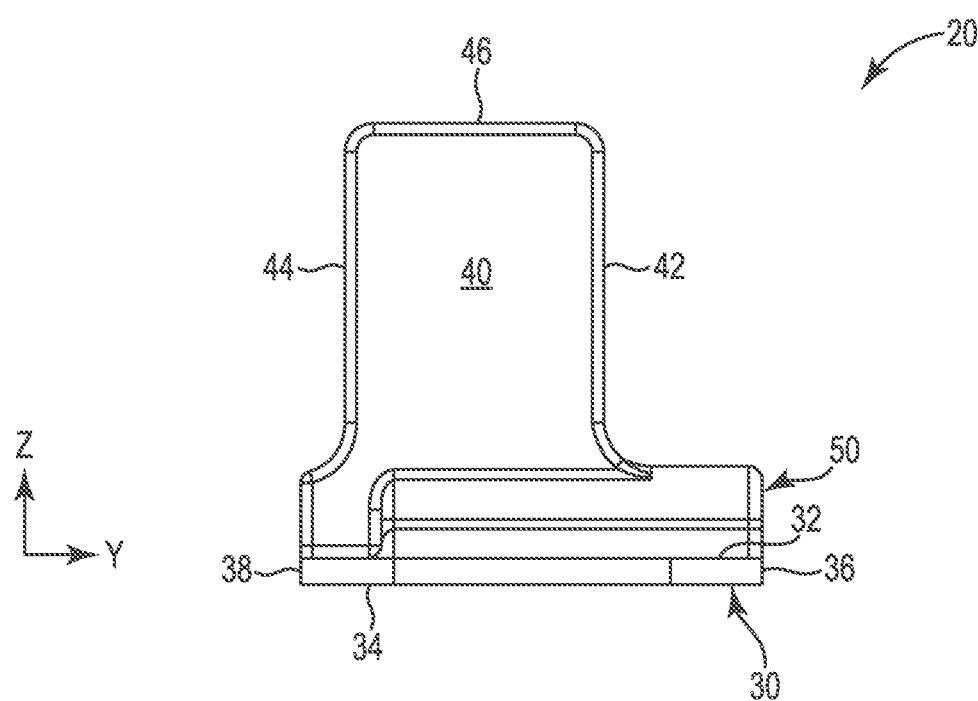
FIG. 6 is a side elevational view of the mull end connector of FIGS. 4-5.
Figure 7:
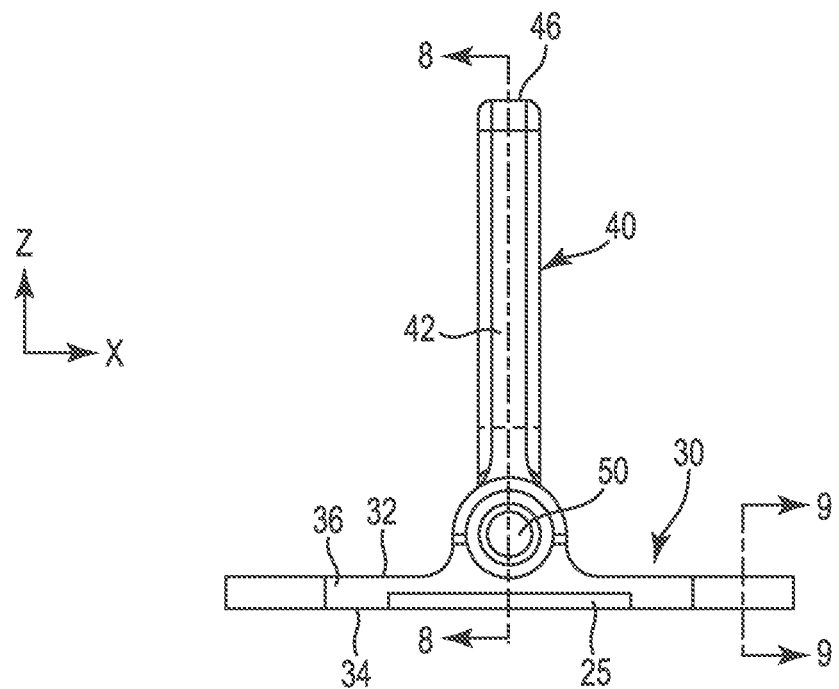
FIG. 7 is a front elevational view of the mull end connector of FIGS. 4-6.
Figure 11:
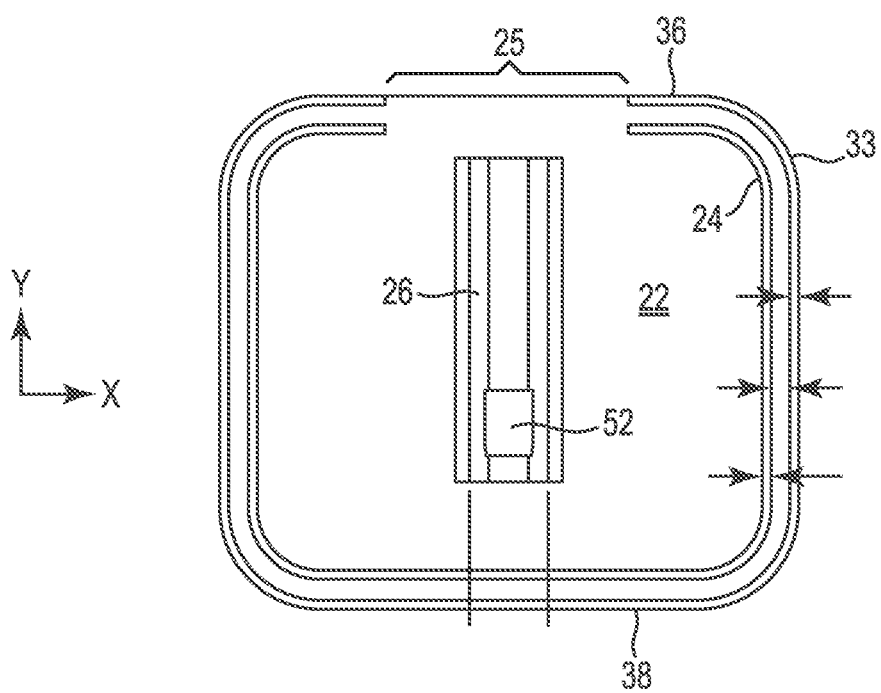
FIG. 11 is a bottom plan view of the mull end connector of FIGS. 4-7.

The depicted illustrative embodiment of the mull end connector 20 also includes a bonding agent cavity 22 on the outer face 34 of the base 30. With reference to FIGS. 5 and 11, the bonding agent cavity 22 includes a border defined by a border wall 24 that defines at least a portion of a cavity perimeter of the bonding agent cavity 22 on the outer face 34 of the base 30. In the depicted illustrative embodiment, the border wall 24 is spaced inward from a base perimeter of the base 30 (towards a geometric center of the outer face 34 of the base 34 as defined by the base perimeter). In one or more alternative embodiments, the border wall 24 defining the cavity perimeter of the bonding agent cavity 22 can be coincident with the base perimeter (in which case the border wall 24 would also be coincident with the base perimeter).

With reference in particular to FIG. 11, in the depicted illustrative embodiment the base perimeter is defined by a base perimeter wall 33 and the border wall 24 and base perimeter wall 33 define a gap that can, in one or more embodiments be used to retain a gasket to assist in sealing the bonding agent cavity 22 when a flowable bonding agent is introduced into the bonding agent cavity 22 as described herein. Even in the absence of a gasket between them, the border wall 24 and the perimeter wall 33 may combine to limit unwanted leakage of a flowable bonding agent out of the bonding agent cavity 22 by providing two separate barriers to flow out of the bonding agent cavity 22 in the portions of the base 30 occupied by the border wall 24 and base perimeter wall 33.

With particular reference to FIGS. 5, 7, 8, and 11, the depicted illustrative embodiment of mull end connector 20 also includes a chamber 54 configured to deliver a flowable bonding agent to the bonding agent cavity 22 of the base 30. The chamber 54 includes an input port 50 located along the interior/exterior axis which is aligned with the Y-axis as discussed herein and, in particular, represented by chamber axis 51 in FIG. 8. The chamber 54 also includes a delivery port 52 opening into the bonding agent cavity 22 of the mull end connector 20. As a result, the input port 50 is in fluid communication with the bonding agent cavity 22 through the chamber 54 and the delivery port 52.

In the depicted illustrative embodiment, the delivery port 52 is located distal from the input port 50 as measured along the chamber axis 51. Spacing the delivery port 52 distal from the input port 50 may avoid the formation of any dead space in the chamber 54 that could collect a flowable bonding agent in a manner that does not enhance bonding of the mull end connector 20 to the surface of the building opening.

Figure 8:
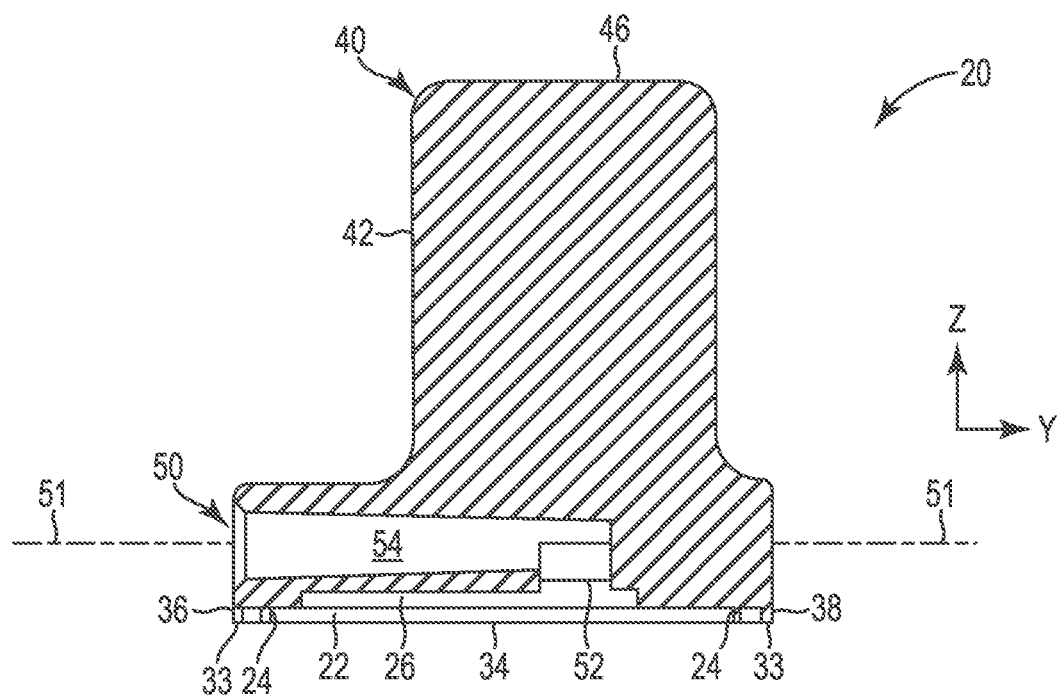
FIG. 8 is a cross-sectional view of the mull end connector of FIGS. 4-7 taken along line 8-8 in FIG. 7.
Figure 9:
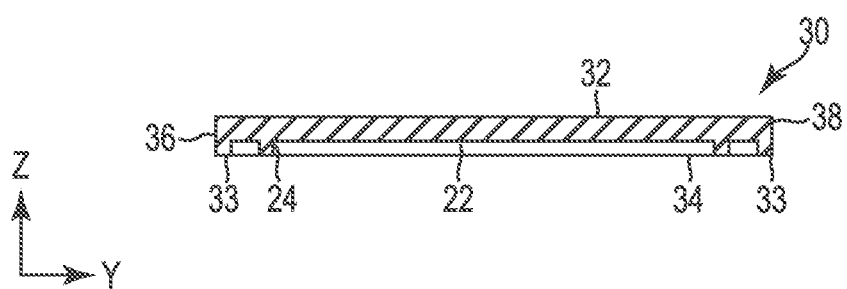
FIG. 9 is a cross-sectional view of the mull end connector of FIGS. 4-7 taken along line 9-9 in FIG. 7.
Figure 10:
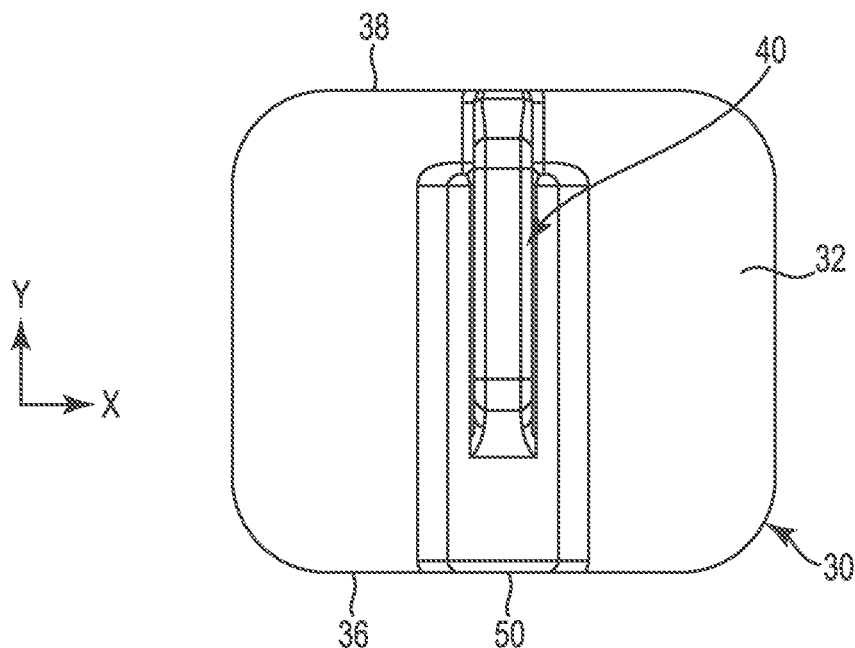
FIG. 10 is a top plan view of the mull end connector of FIGS. 4-7.

With reference to FIGS. 8 and 11, the depicted illustrative embodiment of mull end connector 20 includes an auxiliary volume 26 located between the chamber 54 and the bonding agent cavity 22. Although not required, it is theorized that the auxiliary volume 26 may assist in dispersion of the flowable bonding agent throughout the bonding agent cavity 22 as the flowable bonding agent flows through delivery port 52 into bonding agent cavity 22. Further, in those embodiments in which the mull end connector 20 is manufactured using, e.g., die casting, the auxiliary volume 26 may assist in the die casting process.

Another optional feature of one or more embodiments of the mull end connectors described herein included with the illustrative embodiment of mull end connector 20 is the addition of a fill vent 25 opening into the bonding agent cavity 22. The fill vent 25 is depicted in, for example, FIGS. 7 and 11, with the depicted embodiment of the fill vent 25 being provided by a gap in the border 24 which extends only partially around the cavity perimeter of the bonding agent cavity 22 provided on the outer face 34 of the base 30. The fill vent 25 is configured to provide an exit path out of the bonding agent cavity 22 for a flowable bonding agent delivered into the bonding agent cavity 22 through the input port 50 and chamber 54 as described herein.

In addition to providing a path for air to escape from the bonding agent cavity 22 during delivery of the flowable bonding agent, the fill vent 25 may provide a visual indicator of the fill status of the bonding agent cavity 22 as the flowable bonding agent is introduced into the bonding agent cavity 22. The illustrative embodiment of fill vent 25 depicted in connection with the depicted embodiment of mull end connector 20 is only one example of a fill vent that may allow for both the escape of air from the bonding agent cavity 22 as well as a visual indicator of the fill status of the bonding agent cavity 22. For example, a fill vent may be provided by an opening formed through the inner surface 32 of the base 30 as well as a variety of other options.

Other optional features of mull end connectors used in mull joints of compound fenestration assemblies as described herein and depicted in connection with the illustrative embodiment of mull end connector 20 relate to the positioning of the connector leg 40 and/or the size of the connector leg 40 relative to the base 30 of the mull end connector 20.

In one or more embodiments, the connector leg 40 may be described as having a connector leg depth measured along the interior/exterior axis (corresponding to the Y-axis) and the base 30 may be described as having a base depth measured along the interior/exterior axis, with the connector leg depth being less than the base depth. With reference to, for example, FIGS. 6 and 8, the connector leg depth of the connector leg 40 of the illustrative embodiment of mull end connector 20 may be measured between the forward edge 42 and rear edge 44 of the connector leg 40. Also with reference to FIGS. 6 and 8 (along with FIG. 11), the base depth of the base 30 of the illustrative embodiment of mull end connector 20 may be measured between a front edge 36 and a back edge 38 of the base 30.

In one or more embodiments, the connector leg 40 is not centered on the base 30 in a direction aligned with the interior/exterior axis. In the depicted illustrative embodiment of mull end connector 20 the connector leg 40 is located closer to the back edge 38 of the base 30 than the front edge 36. In the depicted illustrative embodiment of mull end connector 20, the front edge 36 of the base 30 is proximate the input port 50 of the chamber 54. When the connector leg 40 is shifted towards the back edge 38 of the base 30, another way of describing the position of the connector leg 40 on the base 30 may be in terms of the distance between the rear edge 44 of the connector leg 40 and the back edge 38 of the base 30 as measured along the interior/exterior axis as compared to the distance between the forward average 42 of the connector leg 40 and the front edge 36 of the base 30 as measured along the interior/exterior axis. When described using those distances, the distance between the rear edge 44 of connector leg 40 and the back edge 38 of base 30 may be less than the distance between the forward edge 42 of connector leg 40 and the front edge 36 of base 30.

Providing a connector leg 40 that is not centered on the base 30 may allow for placement of the connector leg in a mull end connector cavity that is located more centrally between the interior and exterior sides of a compound fenestration assembly while providing more convenient access to the input port 50 needed to introduce the flowable bonding agent into the bonding agent cavity 22 as described herein.

Another optional feature depicted in connection with the illustrative embodiment of mull end connector 20 relates to the bonding agent cavity depth. In particular, the bonding agent cavity 22 has a depth measured along the mull joint axis (aligned with the Z-axis). In one or more embodiments, the depth of the bonding agent cavity 22 proximate the border (e.g., border wall 24) is less than a depth of the bonding agent cavity 22 proximate the chamber 54. Controlling the depth of the bonding agent cavity may, in one or more embodiments, improve the strength of the bond between the mull end connector and the surface to which the mull end connector is bonded where, for example, the bonding agent exhibits increase strength in response to shearing forces.

In one or more embodiments of mull joints in compound fenestration assemblies including mull end connectors as described herein, it may be advantageous to provide a base plate between the opening surface of a building opening and the end of the mull joint such that the outer face of the mull end connector abuts the base plate. Using a base plate may provide for more uniform strength in the joint formed between the mull end connector and the base plate by providing a surface with properties that are known to be compatible with the flowable bonding agent used to attach the mull end connector to the opening surface of the building opening.

Figure 12:
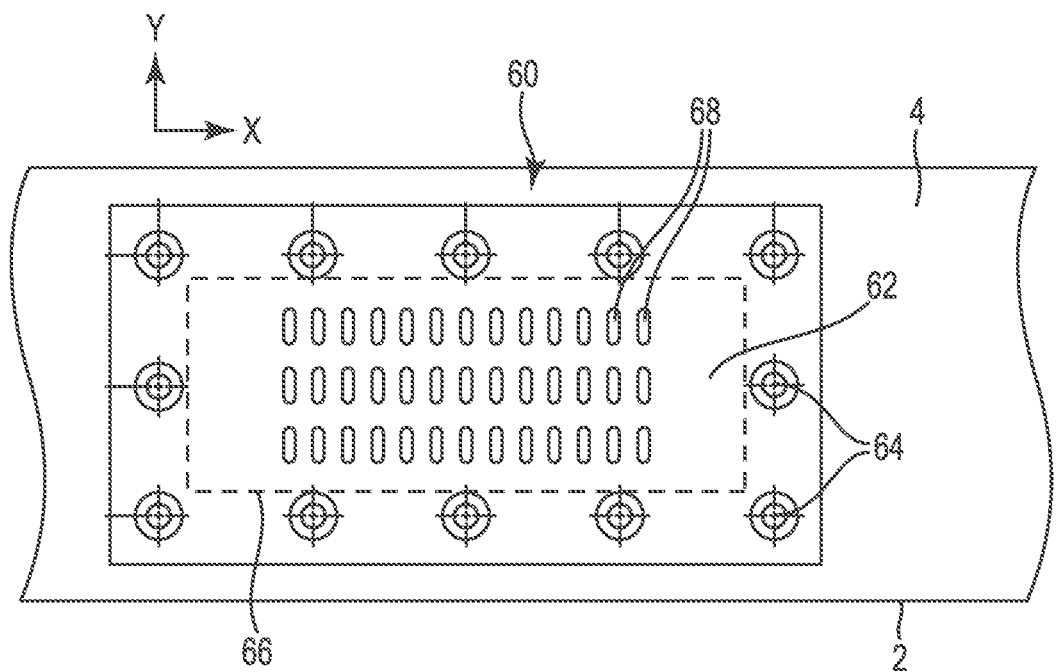
FIG. 12 is a plan view of one illustrative embodiment of a base plate that can be used in one or more embodiments of a mull joint of a compound fenestration assembly as described herein.
Figure 16:
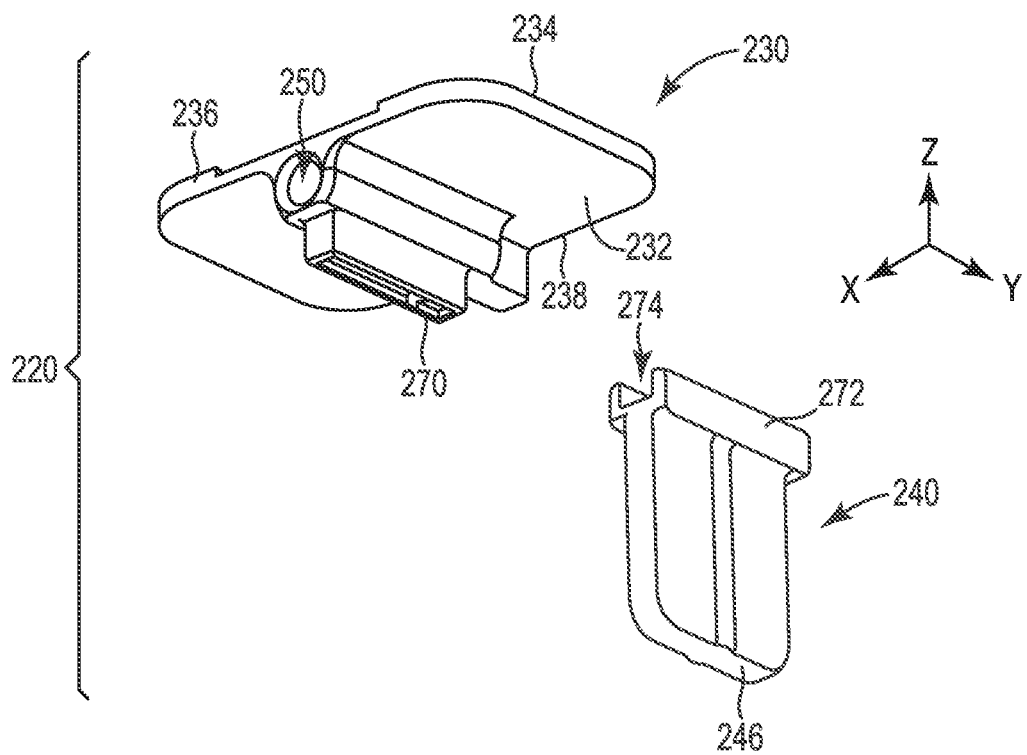
FIG. 16 is an exploded perspective view of one alternative embodiment of a two-part mull end connector that may be used in one or more embodiments of a mull joint of a compound fenestration assembly as described herein.

One illustrative embodiment of a base plate 60 that may be used in connection with the mull end connectors described herein is depicted in FIG. 12. The base plate 60 is shown in position on the opening surface 4 of a framing member 2 defining a portion of a building opening in which a compound fenestration assembly as described herein is to be positioned (illustrative examples of base plate 60 are also depicted in FIGS. 1-2).

Base plates used in connection with the mull end connectors described herein are configured for attachment to the opening surface 4 of the building opening by any suitable technique or combination of techniques. In the depicted illustrative embodiment of base plate 60, fastener opening 64 are provided around the perimeter of the base plate 60 such that base plate 60 can be attached to the framing member 2 by suitable fasteners such as, e.g., threaded fasteners, nails, rivets, etc.

In one or more embodiments, the base plate 60 includes a base plate surface 62 that is larger than the outer face 34 of the base 30 of a mull end connector 20 to be located on the base plate 60. Providing a base plate 60 having an oversized base plate surface 62 relative to the size of the outer face 34 of the base 30 of the mull end connector 20 helps to provide adjustability in the positioning of the mull end connector 20 on the base plate surface 62 during installation of a compound fenestration assembly in a building opening as described herein.

In one or more embodiments in which the base plate includes openings configured to receive mechanical fasteners to attach the base plate to a building opening, such as base plate 60 including fastener openings 64, the openings 64 may be described as defining a receiving surface on the base plate surface 62 within a fastener perimeter 66 (indicated using a broken line) defined within the openings 64. In such an embodiment, it may be preferred that the receiving surface defined by the fastener perimeter 66 is larger than the outer face 34 of the base 30 of the mull end connector used in conjunction with the base plate 60 to avoid placement of the base 30 of the mull end connector 20 over a fastener opening 64.

Another optional feature depicted in connection with the illustrative embodiment of base plate 60 are apertures 68 located within the receiving surface defined by fastener perimeter 66. The apertures 68 may, in one or more embodiments, provide one or more pathways for a flowable bonding agent to reach the underlying opening surface 4 of the framing member 2. Alternatively, the apertures 68 may simply provide wells into which the flowable bonding agent may flow during delivery to further enhance the ability of a mull end connector located on base plate 62 resist shear forces (i.e., forces directed along the interior/exterior axis which is as described herein aligned with the Y-axis of the Cartesian coordinate systems provided in the figures).

Although the depicted illustrative embodiment of base plate 60 includes apertures 68, other features or materials may be used to enhance the bond between a mull end connector and the base plate in a mull joint as described herein. In one or more embodiments, the base plate 60 may include a primer configured to enhance adhesion of a flowable bonding agent, a roughened surface configured to enhance adhesion of a flowable bonding agent, etc. Providing a base plate 60 may also enhance connection of a mull end connector to the base plate by providing a flat surface complementary to a flat outer surface 34 of the mull end connector 20.

In one or more embodiments, the base plate 60 may be constructed of any suitable material or combination of materials that provide a suitable surface for bonding to a mull end connector as discussed herein. In one or more embodiments, metal (e.g., stainless steel, aluminum, etc.), wood, cement, cement block, marble, granite, polymer composites, wood composites, wood/polymer composites, fiberglass, etc. could be used. The specific selection of materials for a base plate used in connection with a mull end connector as described herein may be influenced by the selection of flowable bonding agents used to attach the mull end connectors.

Illustrative methods of installing a compound fenestration assembly in a building opening of a building as described herein may include, in one or more embodiments described in connection with illustrative embodiment of mull end connector 20. As discussed below, installation of only one mull end connector is described, but it should be understood that two or more mull end connectors will typically be installed with each compound fenestration assembly, with pairs of mull end connectors typically found at opposite ends of each mull joint in the compound fenestration assembly.

With two fenestration units connected to each other along a mull joint and a mull end connector cavity provided at an end of the mull joint, the connector leg 46 of a mull end connector 20 is inserted into the mull end connector cavity (e.g., mull end connector cavity 18 in FIG. 3). As discussed herein, the mull joint defines a mull joint axis (e.g., axis 111) extending along a length of the mull joint between the opposite ends of the mull joint.

The fenestration units (e.g., fenestration units 10 of FIG. 2) of the compound fenestration assembly are placed in a building opening after inserting the connector leg 46 of the mull end connector 20 into the mull end connector cavity 18 in the mull joint formed between the fenestration units. An outer face 34 of a base 30 of the mull end connector 20 faces an opening surface 4 defining the building opening proximate the end of the mull joint.

A flowable bonding agent is delivered into the bonding agent cavity 22 on the outer face 34 of the base 30 of the mull end connector 20 after placing the fenestration units in the building opening such that the outer face 34 of the mull end connector 20 faces the opening surface 4 defining the building opening. The bonding agent in the bonding agent cavity bonds the base 30 of the mull end connector 20 to the opening surface 4 (or a base plate 60 if provided).

The flowable bonding agents used in connection with the mull end connectors of compound fenestration assemblies described herein may take a variety of forms. The flowable bonding agent may be, for example, a structural adhesive designed to fasten the materials together (i.e., the material of the mull end connector to the opening surface of the building opening or to the material of a base plate if provided). Examples include, but are not limited to: a methyl methacrylate adhesives, 1 component urethane adhesives, 2 component urethane adhesives, cyanoacrylate adhesives, epoxy-based adhesives, hotmelt adhesives, structural silicone adhesives, etc. It may be preferred that the flowable bonding agent be toughened or impact rated.

By "flowable" as used in connection with the bonding agents described herein, it is meant that the bonding agent has a viscosity selected to reduce the possibility of significant squeeze out (and reverse flow in the glue insert in the case of upside down fill), while still being able to be applied easily by hand using common delivery tools (e.g., squeeze tubes, caulk guns, etc.). In one or more embodiments, the cure time of the bonding agent may be short enough so that a significant amount of final strength is built up while the remaining steps of the install process are performed, for example, the bonding agent may provide 50% or more of its final strength in 1 hour or less (with sufficient time to allow for proper positioning/adjustment of the compound fenestration assembly in a building opening as needed).

In one or more embodiments, the bonding agents used to attach the mull end connectors to the building opening (or base plate where provided) may provide sufficient strength such that the mull end connectors are not attached using any techniques or structures (e.g., blocking, mechanical fasteners, etc.) in addition to the bonding agents.

Selection of the flowable bonding agent will, in at least some cases, be based on the materials used for the mull end connectors. The materials used for the mull end connectors may include any suitable material or combination of materials that provides sufficient strength to perform the functions described herein (e.g., transfer mechanical loads from the compound fenestration assemblies to the building opening, etc.). Suitable materials may include, but are not limited to, one or more of: one or more metals (e.g., zinc, aluminum, stainless steel, magnesium, etc.), polymers, polymer composites, wood (e.g., hardwood), wood composites, wood/polymer composites, fiberglass, etc.

As discussed herein, the method may involve adjusting a position of the mull joint and the fenestration units (and, therefore, the mull end connector 20) relative to the opening surface 4 defining the building opening after placing the fenestration units in the building opening and before delivering the flowable bonding agent into the bonding agent cavity 22 of the mull end connector 20.

As discussed herein, delivering the flowable bonding agent into the bonding agent cavity 22 includes injecting the bonding agent into the chamber 54 in the mull end connector 20 through the input port 50 such that the flowable bonding agent flows through the delivery port 52 into the bonding agent cavity 22.

When a fill vent is provided in the mull end connector 20, the installer may deliver the flowable bonding agent into the bonding agent cavity 22 until the flowable bonding agent exits the bonding agent cavity 22 through a fill vent (e.g., fill vent 25 in mull end connector 20).

Also as discussed herein, the method may involve attaching a base plate 60 to the opening surface 4 defining the building opening before placing the fenestration units in the building opening, with the outer face 34 of the base 30 of the mull end connector 20 facing the base plate 60.

The illustrative embodiment of mull end connector 20 depicted in FIGS. 4-11 includes a connector leg 40 and base 30 that are formed as a one piece completely integral unit through any suitable combination of, e.g., molding, casting, machining, etc. Such a construction is not, however, required and the connector legs of mull end connectors as described herein may be formed as separate components that are attached to separately formed bases. In such embodiments, the connector legs and bases may be attached to each other before use such that the installer handles both components as a single unit during use.

Although the mull end connector 20 is depicted in connection with a mull joint formed using a pair of joining strips, the mull end connectors can also be used with any mull joint providing a mull end connector cavity between the pair of fenestration units at an end of a mull joint, with the mull end connector cavity being configured to receive the connector leg of a mull end connector as described herein. One end of one illustrative embodiment of a mull joint of a compound fenestration assembly is depicted in FIGS. 13-15, with the mull end connector cavity provided in a mull bar located between a pair of adjacent fenestration units of a compound fenestration assembly.

As in some other figures provided herein, the fenestration units 110 of the compound fenestration assembly are represented by their frame members, with a mull bar 112 located between the depicted pair of frame members. The mull bar 112 includes mull end connector cavity 118 opening at the end of the mull joint at which the mull end connector 120 is to be used. As seen in, e.g., FIG. 15, the connector leg 140 is located in the mull end connector cavity 118 while the base 130 of the mull end connector 120 is located proximate the end of the mull joint between the frame members of the fenestration units 110. Although no explicitly described in connection with this embodiment, the mull end connector 120 includes the features needed to receive and distribute a flowable bonding agent to attach the mull end connector 120 to a building opening as described herein.

Although the mull bar 112 may extend over the length of the mull joint to the opposite end of the mull joint between the fenestration units 110 of the compound fenestration assembly, that would not be required if, for example, a mull end connector were to be provided only at one end of the mull joint. In another variation, two shorter mull bars 112 could be provided, with one mull bar 112 located at each end of the mull joint and each mull bar 112 providing a mull end connector cavity 118 if a mull end connector were to be installed at both ends of the mull joint. It may be advantageous from a structural standpoint for a single unitary mull bar 112 to extend continuously between the ends of the mull joint.

Figure 13:
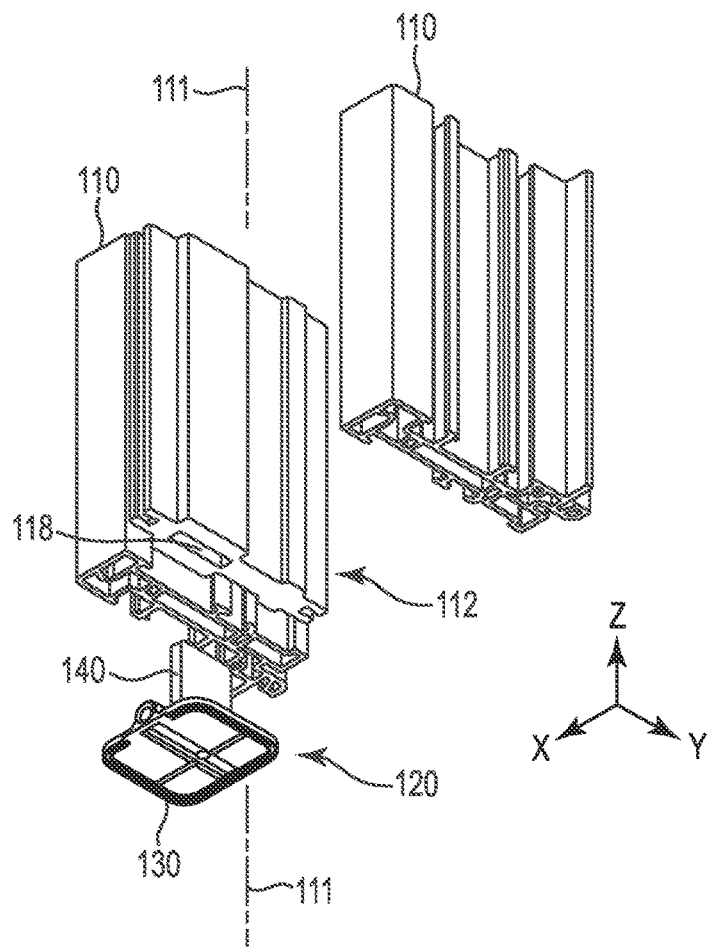
FIG. 13 is a partially exploded bottom perspective view of one end of another illustrative embodiment of a mull joint of a compound fenestration assembly as described herein.
Figure 14:
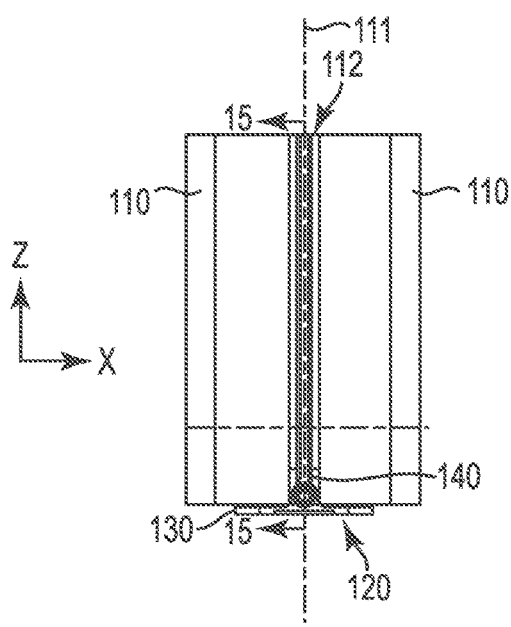
FIG. 14 is a front elevational view of the mull joint of FIG. 13 after assembly.
Figure 15:
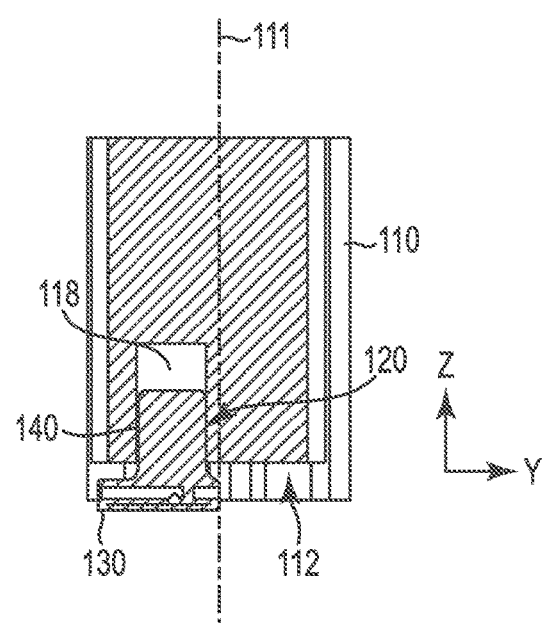
FIG. 15 is a cross-sectional view of the mull joint of FIG. 14 taken along line 15-15 in FIG. 14.
Figure 17:
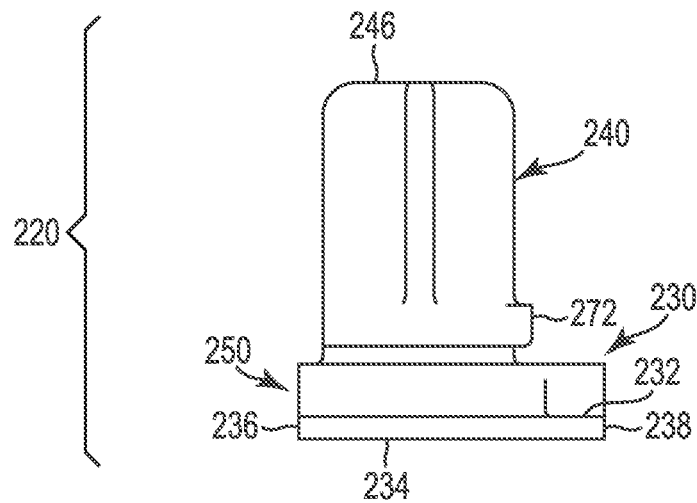
FIG. 17 is side elevational view of the two-part mull end connector of FIG. 16 after assembly of the mull end connector.
Figure 18:
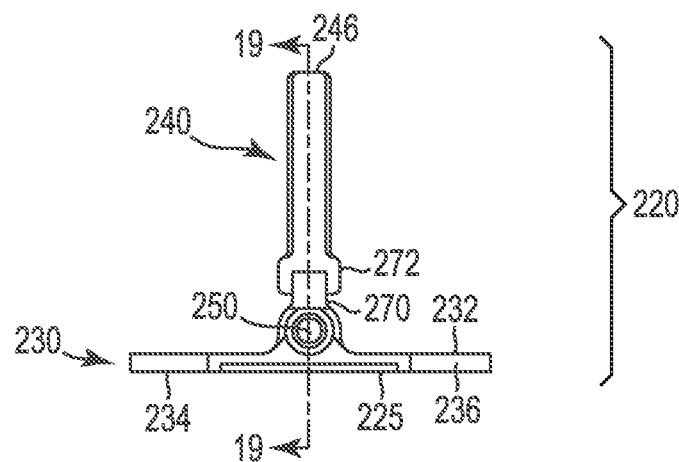
FIG. 18 is a front elevational view of the two-part mull end connector of FIG. 16.

In addition to depicting a mull bar providing a mull end connector cavity, another optional feature depicted in connection with FIGS. 13-15 is that the depth of the mull end connector cavity 118 may be limited. In other words, in contrast to the depicted illustrative embodiments of joining strips 12 and 13 in which a mull end connector cavity 18 is formed that extends over the entire length of the joining strips 12 and 13, the mull end connector cavity 118 is deep enough to receive the connector leg 140 of the mull end connector 120 but does not extend over the entire length of the mull bar 112.

In one or more alternative embodiments of mull end connectors as described herein, however, the connector legs and bases may be provided separately and assembled on site as part of the installation process for a compound fenestration assembly including a mull joint incorporating the mull end connectors described herein. One such illustrative embodiment of a two-part mull end connector including a base 230 and a connector leg 240 as separate and discrete components is depicted in FIGS. 16-21.

In the depicted embodiment, the base 230 of mull end connector 220 includes many of the same features found in illustrative embodiment of mull end connector 20 described herein. For example, base 230 includes an inner surface 232 and an outer surface 234, a front edge 236 and a back edge 238, an input port 250 leading into a chamber 254, a delivery port 252 leading from the chamber 254 into a bonding agent cavity 222 provided on the outer face 234 of the base 230. Mull end connector 220 also includes a fill vent 225 located on the perimeter of the base 230. As a result, delivery of a flowable bonding agent into chamber 254 through input port 250 delivers that flowable bonding agent into the bonding agent cavity 222 through delivery port 252 in much the same manner as discussed above in connection with mull end connector 20.

The alternative embodiment of mull end connector 220 includes additional features configured to allow for assembly of the connector leg 242 the base 230 as part of the installation process. In particular, the connector leg 246 may be described as attaching to the base 230 at a mull end connector joint. In the depicted illustrative embodiment the mull end connector joint is provided in the form of a connector leg post 270 on the base 230 and a connector leg post receiver 272 on the connector leg 240. The connector leg post receiver 272 is located opposite from the terminal and 246 of the connector leg 240. The connector leg post receiver 272 includes a cavity 274 configured to receive the connector leg post 270 on the base 230 when the connector leg 240 is assembled with the base 230.

As noted above, the base 230 of mull end connector 220 includes an input port 250, chamber 254, and delivery port 252 to deliver a flowable bonding agent into the bonding agent cavity 222 on the outer face 234 of the base 230. The depicted illustrative embodiment of mull end connector 220 includes a bonding agent reservoir 276 between the base 230 and the connector leg 240. The bonding agent reservoir 276 is in fluid communication with the chamber 254 through a reservoir port 278 such that the input port 250 is in fluid communication with the bonding agent reservoir 276 through the chamber 254 and the reservoir port 278.

As a result, when a flowable bonding agent is introduced into chamber 254 through input port 250, the flowable bonding agent moves into the bonding agent cavity 222 through delivery port 252 and also moves into bonding agent reservoir 276 between base 230 and connector leg 240 through reservoir port 278. The flowable bonding agent delivered into bonding agent reservoir 276 assists in retaining connector leg 240 attached to the base 230. In the depicted illustrative embodiment, the bonding agent reservoir is formed between connector leg post 270 on base 230 and connector leg post receiver 272 on connector leg 240.

Figure 19:
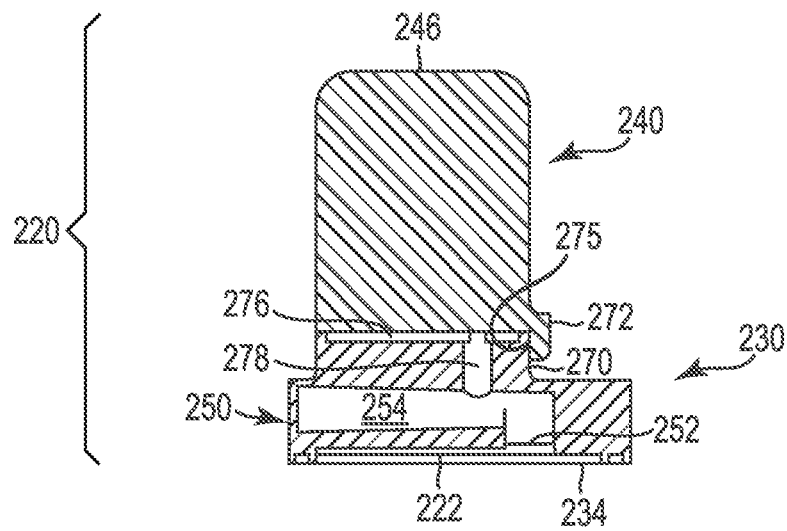
FIG. 19 is a cross-sectional view of the two-part mull end connector of FIGS. 17-18 taken along line 19-19 in FIG. 18.

The depicted illustrative embodiment of two-part mull end connector 220 may include a stop 275 located at one end of the cavity 274 in the connector leg post receiver 272 such that as base 230 is moved to the right along the Y-axis in FIG. 19 (corresponding to the interior/exterior axis), proper positioning of the base 230 relative to the connector leg 240 can be achieved when the stop 275 limits further movement of the base 230.

Figure 20:
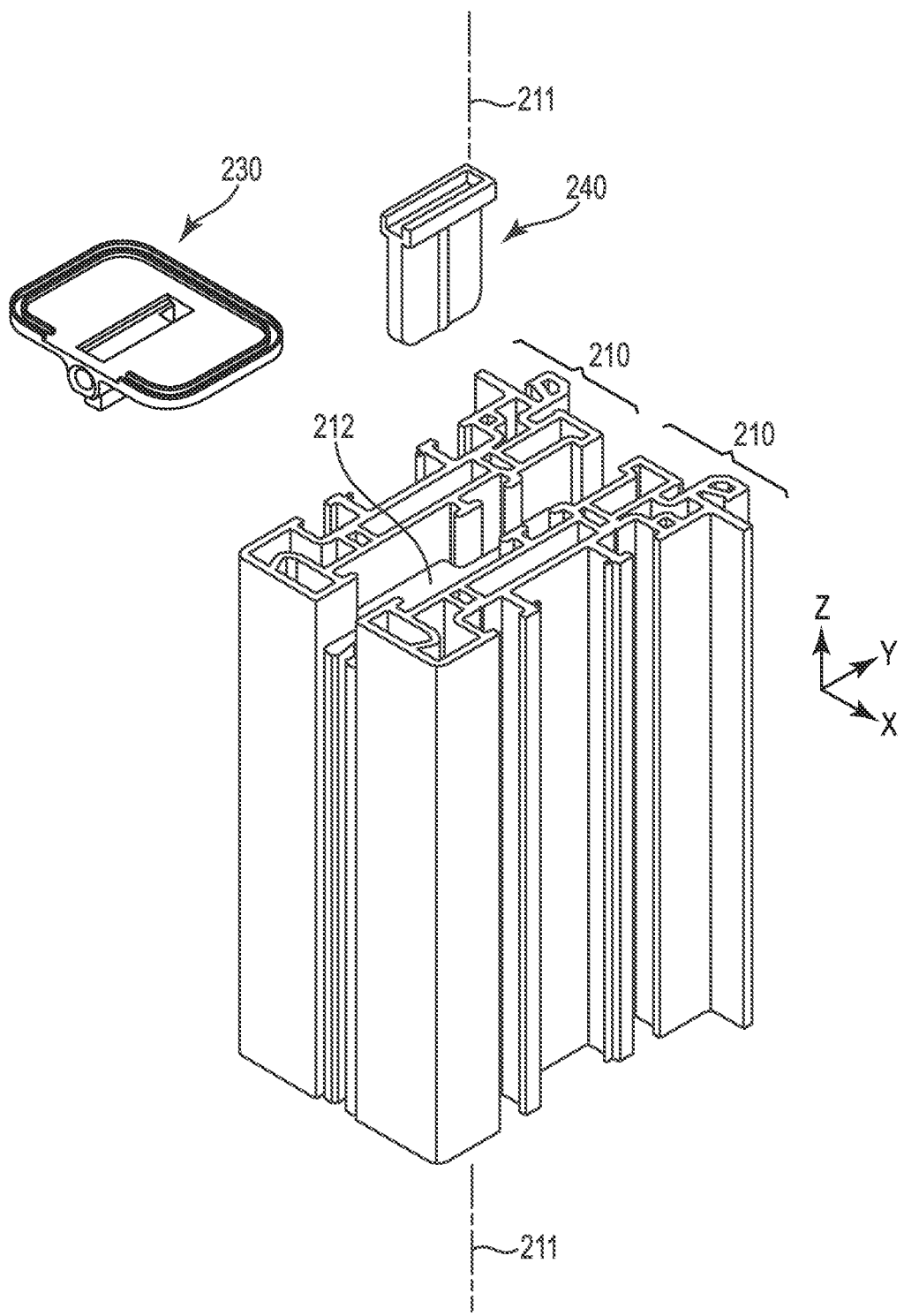
FIG. 20 is a perspective view of the two-part mull end connector of FIGS. 16-19 shown during assembly with a mull joint of a compound fenestration assembly as described herein.
Figure 21:
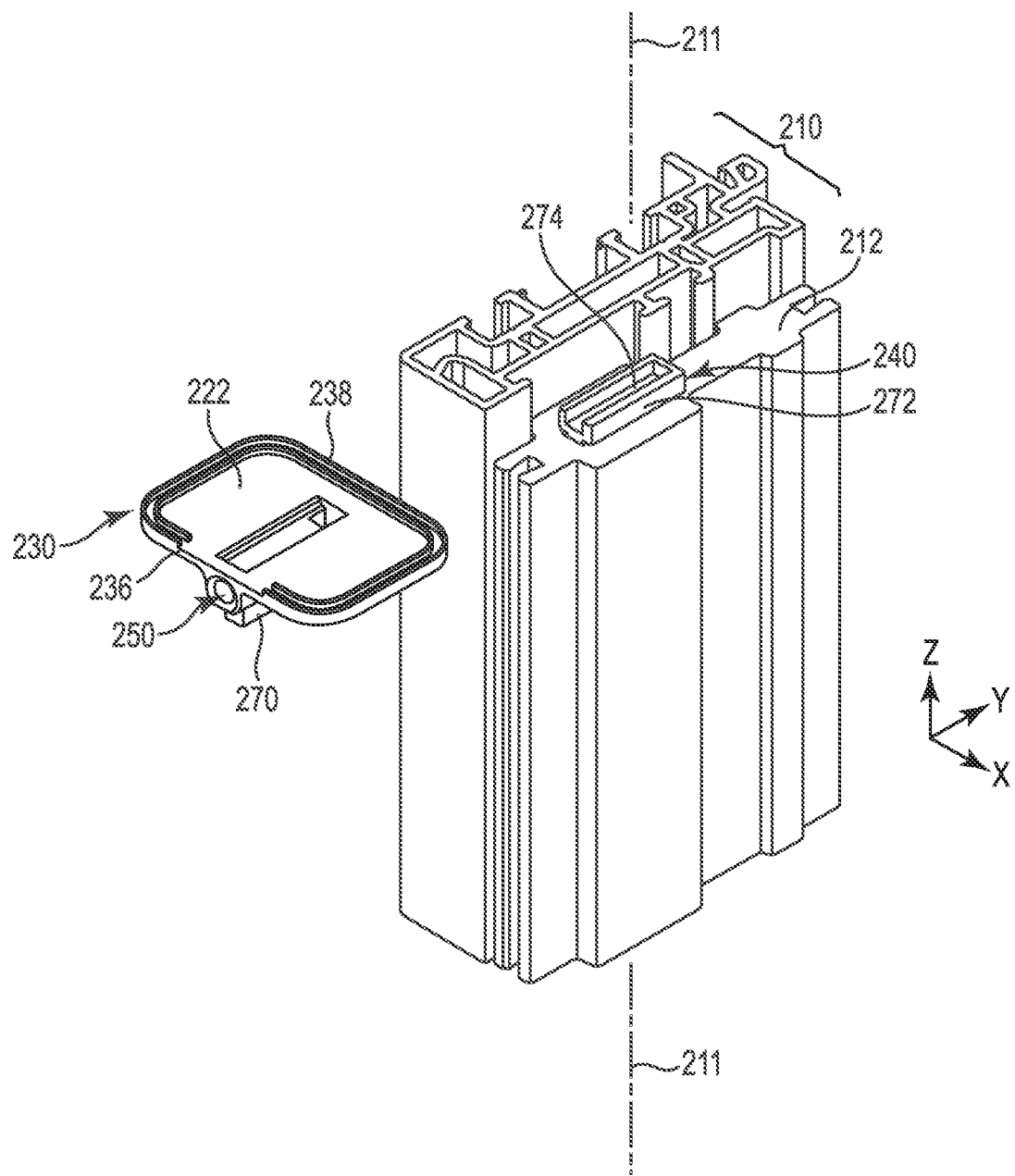
FIG. 21 is a perspective view of FIG. 20 after removal of one frame member of a fenestration unit to expose the mull joint during the assembly process when using the two-part mull end connector of FIGS. 16-19.

With reference to FIGS. 20-21, one illustrative embodiment of a mull bar 212 provided between a pair of fenestration units 210 is depicted to illustrate the assembly process when using a two-part mull end connector. One of the fenestration units 210 is removed from the assembly in FIG. 21 to allow for visualization of the connector leg 240 after insertion of the connector leg 240 into a mull joint end cavity provided in the end of the mull bar 212. The connector leg 240 is inserted into the mull joint and cavity by advancing the connector leg 240 along the direction of the mull joint axis 211 (which as discussed herein corresponds to the Z-axis).

After positioning the connector leg 240 in the mull joint end cavity, the base 230 of the two-part mull end connector can be advanced along the interior/exterior axis (which, as discussed herein, corresponds to the Y-axis) such that the connector leg post 270 on base 230 is advanced into the cavity 274 on the connector leg post receiver 272 to form the bonding agent reservoir 276 as described herein.

In a method of installing a compound fenestration assembly including a mull joint having a two-part mull end connector as described herein, the installation process may involve placement of the connector leg 240 in a mull joint end cavity at the end of a mull bar 212 as seen in, e.g., FIG. 21. With the connector leg 240 in the mull joint end cavity at the end of the mull bar 212, the compound fenestration assembly can be placed in a building opening.

After placing the compound fenestration assembly in the building opening, the base plate 230 of the two-part mull end connector 120 can be moved into position such that the connector leg post 270 on base 230 is advanced into the cavity 274 on the connector leg post receiver 272. Installation may, in one or more embodiments, in all moving the connector leg 240 along the mull joint axis 211 such that the connector leg post 270 is properly positioned in the cavity 274 on the connector leg post receiver 272.

After assembling the base 230 and connector leg 240 and positioning the compound fenestration assembly in a desired location within the building opening, a flowable bonding agent can be introduced into the input port 250 on the base 230 such that the flowable bonding agent moves into the bonding agent cavity 222 to attach the base 232 the opening surface of the building opening as well as delivering bonding agent into the bonding agent reservoir 276 between base 230 and connector leg 242 attach connector leg 242 the base 230.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of fenestration mulling systems and methods are discussed herein some possible variations have been described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

The invention claimed is:

1. A compound fenestration assembly comprising:
    a first fenestration unit attached to a second fenestration unit along a mull joint having a first end and a second end, wherein the mull joint defines a mull joint axis extending along a length of the mull joint between the first and second ends of the mull joint, and wherein the first and second fenestration units comprise exterior sides facing in the same direction and interior sides facing in an opposite direction from the exterior sides, wherein an interior/exterior axis extends between the interior and exterior sides in a direction transverse to the mull joint axis;
    a mull end connector cavity located between the first fenestration unit and the second fenestration unit at the first end of the mull joint; and
    a mull end connector comprising:
        a base comprising an inner face facing the first end of the mull joint and an outer face facing away from the first end of the mull joint,
        a connector leg attached to the inner face of the base, the connector leg extending away from the inner face along the mull joint axis, the connector leg extending into the mull end connector cavity between the first fenestration unit and the second fenestration unit at the first end of the mull joint,
        a bonding agent cavity on the outer face of the base, the bonding agent cavity comprising a border defining at least a portion of a cavity perimeter located within a base perimeter on the outer face of the base, and
        a chamber configured to deliver bonding agent to the bonding agent cavity, the chamber comprising an input port located along the interior/exterior axis and a delivery port opening into the bonding agent cavity, wherein the input port is in fluid communication with the bonding agent cavity through the chamber and the delivery port.

2. A compound fenestration assembly according to claim 1, wherein the connector leg is retained within the mull end connector cavity by an interference fit.

3. A compound fenestration assembly according to claim 1, wherein the border of the bonding agent cavity defines a gap such that the border extends only partially around the cavity perimeter.

4. A compound fenestration assembly according to claim 1, wherein the mull end connector comprises a fill vent opening into the bonding agent cavity, the fill vent configured to provide an exit path out of the bonding agent cavity for a flowable bonding agent delivered into the bonding agent cavity through the input port.

5. A compound fenestration assembly according to claim 4, wherein the fill vent comprises a gap in the border such that the border extends only partially around the cavity perimeter.

6. A compound fenestration assembly according to claim 1, wherein the base perimeter on the outer face of the base comprises a base perimeter wall, and wherein the border comprises a border wall, wherein at least a portion of the border wall is spaced inward from the base perimeter wall towards a geometric center of the outer face of the base as defined by the base perimeter.

7. A compound fenestration assembly according to claim 1, wherein the chamber defines a chamber axis extending through the input port and aligned with the interior/exterior axis, wherein the delivery port is located distal from the input port as measured along the chamber axis.

8. A compound fenestration assembly according to claim 1, wherein the connector leg comprises a connector leg depth measured along the interior/exterior axis, and wherein the base comprises a base depth measured along the interior/exterior axis, wherein the connector leg depth is less than the base depth.

9. A compound fenestration assembly according to claim 8, wherein the connector leg is not centered on the base in a direction aligned with the interior/exterior axis.

10. A compound fenestration assembly according to claim 1, wherein the base comprises a front edge proximate the input port and a back edge distal from the front edge as measured along the interior/exterior axis, wherein the connector leg comprises a connector leg depth measured between a forward edge and a rear edge along the interior/exterior axis, wherein a first distance between the rear edge and the back edge measured along the interior/exterior axis is less than a second distance between the forward edge and the front edge measured along the interior/exterior axis.

11. A compound fenestration assembly according to claim 1, wherein the bonding agent cavity comprises a depth measured along the mull joint axis, and wherein the depth of the bonding agent cavity proximate the border is less than a depth of the bonding agent cavity proximate the chamber.

12. A compound fenestration assembly according to claim 1, wherein the compound fenestration assembly comprises a base plate configured to be placed between a building opening and the outer face of the mull end connector, wherein the base plate is configured for attachment to the building opening, and wherein the base plate comprises a base plate surface larger than the outer face of the base.

13. A compound fenestration assembly according to claim 12, wherein the base plate comprises a plurality of openings configured to receive mechanical fasteners to attach the base plate to the building opening, and wherein the plurality of openings define a receiving surface on the base plate surface within a fastener perimeter defined by the plurality of openings, and wherein the receiving surface is larger than the outer face of the base.

14. A compound fenestration assembly according to claim 12, wherein the base plate comprises a metal plate.

15. A compound fenestration assembly according to claim 1, wherein the base and the connector leg of the mull end connector are separate and discrete components, wherein the bonding agent cavity and the chamber are located in the base, and wherein the connector leg attaches to the base at a mull end connector joint.

16. A compound fenestration assembly according to claim 15, wherein the mull end connector joint defines a bonding agent reservoir between the base and the connector leg, wherein the bonding agent reservoir is in fluid communication with the chamber through a reservoir port such that the input port is in fluid communication with the bonding agent reservoir through the chamber and the reservoir port.

17. A compound fenestration assembly according to claim 1, wherein the bonding agent comprises one or more flowable bonding agents selected from the group of: methyl methacrylate adhesive, urethane adhesive, cyanoacrylate adhesive, epoxy-based adhesive, hotmelt adhesive, and structural silicone adhesive.

18. A compound fenestration assembly:
a mull joint connecting a first fenestration unit to a second fenestration unit, the mull joint defining a mull joint axis extending along a length of the mull joint between a first end and a second end of the mull joint;
a mull end connector located at the first end of the mull joint, the mull end connector comprising:
 a connector leg extending into a mull end connector cavity extending into the mull joint at the first end of the mull joint, and
 a base attached to the connector leg, wherein the base comprises an outer face extending away from the first end of the mull joint; and
a flowable bonding agent located between the outer face of the base of the mull end connector and an opening surface defining a building opening in which the first fenestration unit, mull joint, and second fenestration unit are located, wherein the flowable bonding agent is configured to bond the base of the mull end connector to the opening surface;
wherein the base of the mull end connector defines a bonding agent cavity located between the base and the opening surface of the building opening;
wherein the mull end connector comprises a chamber configured to deliver the flowable bonding agent to the bonding agent cavity, the chamber comprising an input port and a delivery port opening into the bonding agent cavity, wherein the input port is in fluid communication with the bonding agent cavity through the chamber and the delivery port; and
wherein the bonding agent cavity comprises a depth measured along the mull joint axis, and wherein the depth of the bonding agent cavity proximate an outer perimeter of the bonding agent cavity is less than a depth of the bonding agent cavity proximate the delivery port.

19. A compound fenestration assembly according to claim 18, wherein the connector leg is retained within the mull end connector cavity by an interference fit.

20. A compound fenestration assembly according to claim 18, wherein the base of the mull end connector comprises a border defining at least a portion of a cavity perimeter located within a base perimeter on the outer face of the base, wherein the border defines a gap such that the border extends only partially around the cavity perimeter.

21. A compound fenestration assembly according to claim 18, wherein the mull end connector comprises a fill vent opening into the bonding agent cavity, the fill vent configured to provide an exit path out of the bonding agent cavity for the flowable bonding agent delivered into the bonding agent cavity.

22. A compound fenestration assembly according to claim 21, wherein the base of the mull end connector comprises a border defining at least a portion of a cavity perimeter located within a base perimeter on the outer face of the base, and wherein the fill vent comprises a gap in the border such that the border extends only partially around the cavity perimeter.

23. A compound fenestration assembly according to claim 18, wherein the connector leg comprises a connector leg depth measured along an interior/exterior axis oriented transverse to the mull joint axis, and wherein the base comprises a base depth measured along the interior/exterior axis, wherein the connector leg depth is less than the base depth.

24. A compound fenestration assembly according to claim 23, wherein the connector leg is not centered on the base in a direction aligned with the interior/exterior axis.

25. A compound fenestration assembly according to claim 18, wherein the assembly comprises a base plate configured to be placed between a building opening and the outer face of the base of the mull end connector, wherein the base plate is configured for attachment to the building opening, and wherein the base plate comprises a base plate surface larger than the outer face of the base.

26. A compound fenestration assembly according to claim 25, wherein the base plate comprises a plurality of openings configured to receive mechanical fasteners to attach the base plate to the building opening, and wherein the plurality of openings define a receiving surface on the base plate surface within a fastener perimeter defined by the plurality of openings, and wherein the receiving surface is larger than the outer face of the base.

27. A compound fenestration assembly according to claim 26, wherein the base plate comprises a metal plate.

28. A compound fenestration assembly according to claim 18, wherein the base and the connector leg of the mull end connector are separate and discrete components, wherein the connector leg attaches to the base at a mull end connector joint.

29. A compound fenestration assembly according to claim 18, wherein the flowable bonding agent comprises one or more of: methyl methacrylate adhesive, urethane adhesive, cyanoacrylate adhesive, epoxy-based adhesive, hotmelt adhesive, and structural silicone adhesive.

30. A compound fenestration assembly:
  a mull joint connecting a first fenestration unit to a second fenestration unit, the mull joint defining a mull joint axis extending along a length of the mull joint between a first end and a second end of the mull joint;
  a mull end connector located at the first end of the mull joint, the mull end connector comprising:
    a connector leg extending into a mull end connector cavity extending into the mull joint at the first end of the mull joint, and
    a base attached to the connector leg, wherein the base comprises an outer face extending away from the first end of the mull joint; and
  a flowable bonding agent located between the outer face of the base of the mull end connector and an opening surface defining a building opening in which the first fenestration unit, mull joint, and second fenestration unit are located, wherein the flowable bonding agent is configured to bond the base of the mull end connector to the opening surface;
  wherein the base of the mull end connector defines a bonding agent cavity located between the base and the opening surface of the building opening;
  a fill vent opening into the bonding agent cavity, the fill vent configured to provide an exit path out of the bonding agent cavity for the flowable bonding agent delivered into the bonding agent cavity;
  wherein the base of the mull end connector comprises a border defining at least a portion of a cavity perimeter located within a base perimeter on the outer face of the base, and wherein the fill vent comprises a gap in the border such that the border extends only partially around the cavity perimeter.

31. A compound fenestration assembly according to claim 30, wherein the connector leg is retained within the mull end connector cavity by an interference fit.

32. A compound fenestration assembly according to claim 30, wherein the base of the mull end connector comprises a border defining at least a portion of a cavity perimeter located within a base perimeter on the outer face of the base, wherein the border defines a gap such that the border extends only partially around the cavity perimeter.

33. A compound fenestration assembly according to claim 30, wherein the mull end connector comprises a chamber configured to deliver the flowable bonding agent to the bonding agent cavity, the chamber comprising an input port opening and a delivery port opening into the bonding agent cavity, wherein the input port is in fluid communication with the bonding agent cavity through the chamber and the delivery port.

34. A compound fenestration assembly according to claim 30, wherein the connector leg comprises a connector leg depth measured along an interior/exterior axis oriented transverse to the mull joint axis, and wherein the base comprises a base depth measured along the interior/exterior axis, wherein the connector leg depth is less than the base depth.

35. A compound fenestration assembly according to claim 34, wherein the connector leg is not centered on the base in a direction aligned with the interior/exterior axis.

36. A compound fenestration assembly according to claim 30, wherein the assembly comprises a base plate configured to be placed between a building opening and the outer face of the base of the mull end connector, wherein the base plate is configured for attachment to the building opening, and wherein the base plate comprises a base plate surface larger than the outer face of the base.

37. A compound fenestration assembly according to claim 36, wherein the base plate comprises a plurality of openings configured to receive mechanical fasteners to attach the base plate to the building opening, and wherein the plurality of openings define a receiving surface on the base plate surface within a fastener perimeter defined by the plurality of openings, and wherein the receiving surface is larger than the outer face of the base.

38. A compound fenestration assembly according to claim 30, wherein the base and the connector leg of the mull end connector are separate and discrete components, wherein the connector leg attaches to the base at a mull end connector joint.

39. A compound fenestration assembly according to claim 30, wherein the flowable bonding agent comprises one or more flowable bonding agents selected from the group of: methyl methacrylate adhesive, urethane adhesive, cyanoacrylate adhesive, epoxy-based adhesive, hotmelt adhesive, and structural silicone adhesive.

* * * * *